United States Patent
Keondjian et al.

(10) Patent No.: US 9,164,653 B2
(45) Date of Patent: Oct. 20, 2015

(54) THREE-DIMENSIONAL SPACE FOR NAVIGATING OBJECTS CONNECTED IN HIERARCHY

(71) Applicant: InSpace Technologies Limited, London (GB)

(72) Inventors: Servan Keondjian, London (GB); Saman Gerami, London (GB); David Virapen, London (GB); David Holme, London (GB)

(73) Assignee: InSpace Technologies Limited, London (GB)

( * ) Notice: Subject to any disclaimer, the term of this patent is extended or adjusted under 35 U.S.C. 154(b) by 0 days.

(21) Appl. No.: 14/181,467

(22) Filed: Feb. 14, 2014

(65) Prior Publication Data

US 2014/0267241 A1    Sep. 18, 2014

Related U.S. Application Data

(60) Provisional application No. 61/800,839, filed on Mar. 15, 2013.

(51) Int. Cl.
*G06F 3/0481* (2013.01)
*G06F 17/30* (2006.01)

(52) U.S. Cl.
CPC ...... *G06F 3/04815* (2013.01); *G06F 17/30058* (2013.01)

(58) Field of Classification Search
CPC ............ G06F 3/04815; G06F 3/04817; G06F 3/0482; G06F 3/04842; G06F 3/04845; G06F 3/0485; G06F 17/30058; G06T 15/10; G06T 15/12

USPC .................. 715/760, 836, 850–852
See application file for complete search history.

(56) References Cited

U.S. PATENT DOCUMENTS

| | | | |
|---|---|---|---|
| 5,251,322 A | | 10/1993 | Doyle et al. |
| 5,276,785 A | * | 1/1994 | Mackinlay et al. ........... 345/427 |
| 5,548,694 A | * | 8/1996 | Frisken Gibson ............ 345/424 |
| 5,608,850 A | * | 3/1997 | Robertson ..................... 345/427 |
| 5,812,134 A | | 9/1998 | Pooser et al. |

(Continued)

FOREIGN PATENT DOCUMENTS

| | | |
|---|---|---|
| WO | 2005/091198 | 9/2005 |
| WO | 2009/000028 | 12/2008 |
| WO | 2013/184704 | 12/2013 |

OTHER PUBLICATIONS

Adams, Dan, Portal Review, Oct. 9, 2007, retrieved via Internet at http://www.ign.com/articles/2007/10/09/portal-review on May 22, 2014, pp. 2 to 3.*

(Continued)

*Primary Examiner* — James T Durkin
(74) *Attorney, Agent, or Firm* — Novak Druce Connolly Bove + Quigg LLP

(57) ABSTRACT

Disclosed herein are systems, methods, and non-transitory computer-readable storage media for browsing objects organized in a hierarchy using a three-dimensional user interface. Some embodiments of the present technology involve a platform that renders an interface that represents objects that are hierarchically connected in three-dimensional space and that allows navigation through the hierarchy by moving through the three-dimensional space.

9 Claims, 23 Drawing Sheets

(56) References Cited

U.S. PATENT DOCUMENTS

| | | | |
|---|---|---|---|
| 5,838,326 A * | 11/1998 | Card et al. | 715/775 |
| 6,094,196 A | 7/2000 | Berry et al. | |
| 6,097,393 A | 8/2000 | Prouty, IV et al. | |
| 6,204,850 B1 | 3/2001 | Green | |
| 6,236,398 B1 * | 5/2001 | Kojima et al. | 345/419 |
| 6,246,406 B1 * | 6/2001 | Nielsen et al. | 715/781 |
| 6,253,218 B1 * | 6/2001 | Aoki et al. | 715/201 |
| 6,346,956 B2 | 2/2002 | Matsuda | |
| 6,473,751 B1 * | 10/2002 | Nikolovska et al. | 1/1 |
| 6,501,469 B1 | 12/2002 | MacPhail | |
| 6,628,313 B1 * | 9/2003 | Minakuchi et al. | 715/853 |
| 6,714,201 B1 | 3/2004 | Grinstein et al. | |
| 6,731,314 B1 | 5/2004 | Cheng et al. | |
| 7,107,549 B2 * | 9/2006 | Deaton et al. | 715/836 |
| 7,134,095 B1 | 11/2006 | Smith et al. | |
| 7,165,070 B2 | 1/2007 | Page et al. | |
| 7,356,777 B2 * | 4/2008 | Borchardt et al. | 715/836 |
| 7,412,667 B2 * | 8/2008 | Chrysanthakopoulos | 715/853 |
| 7,447,999 B1 * | 11/2008 | Robertson et al. | 715/835 |
| 7,467,356 B2 * | 12/2008 | Gettman et al. | 715/850 |
| 7,502,770 B2 | 3/2009 | Hillis et al. | |
| 7,543,245 B2 * | 6/2009 | Irimajiri | 715/836 |
| 7,562,312 B2 * | 7/2009 | Rochford et al. | 715/848 |
| 7,827,507 B2 | 11/2010 | Geise et al. | |
| 8,117,563 B2 * | 2/2012 | Ok et al. | 715/848 |
| 8,269,842 B2 | 9/2012 | Wang et al. | |
| 8,276,088 B2 | 9/2012 | Ke et al. | |
| 8,291,322 B2 * | 10/2012 | Klappert et al. | 715/721 |
| 8,341,541 B2 * | 12/2012 | Holecek et al. | 715/782 |
| 8,386,955 B1 * | 2/2013 | Weber et al. | 715/781 |
| 8,402,377 B2 * | 3/2013 | Riley et al. | 715/757 |
| 8,468,469 B1 * | 6/2013 | Mendis et al. | 715/863 |
| 8,533,622 B2 * | 9/2013 | Estrada et al. | 715/776 |
| 8,549,407 B2 | 10/2013 | O'Neil Garcia | |
| 8,584,047 B2 | 11/2013 | Athans et al. | |
| 8,589,789 B2 | 11/2013 | Grunberger | |
| 8,601,402 B1 | 12/2013 | Habboub | |
| 8,610,743 B2 | 12/2013 | Poston et al. | |
| 8,812,987 B2 * | 8/2014 | Joynes et al. | 715/836 |
| 8,887,100 B1 | 11/2014 | Cook et al. | |
| 8,947,558 B2 * | 2/2015 | You et al. | 348/231.2 |
| 2001/0028369 A1 * | 10/2001 | Gallo et al. | 345/848 |
| 2002/0013813 A1 * | 1/2002 | Matsuoka | 709/204 |
| 2002/0033849 A1 * | 3/2002 | Loppini et al. | 345/848 |
| 2002/0089550 A1 * | 7/2002 | Orbanes et al. | 345/853 |
| 2002/0174121 A1 * | 11/2002 | Clemie | 707/10 |
| 2005/0216515 A1 | 9/2005 | Bray et al. | |
| 2006/0048076 A1 * | 3/2006 | Vronay et al. | 715/850 |
| 2006/0107232 A1 * | 5/2006 | Salt et al. | 715/810 |
| 2006/0271861 A1 * | 11/2006 | Yolleck et al. | 715/760 |
| 2007/0236515 A1 * | 10/2007 | Montague | 345/649 |
| 2008/0005699 A1 | 1/2008 | Dvorak et al. | |
| 2008/0051989 A1 * | 2/2008 | Welsh | 701/208 |
| 2008/0235320 A1 | 9/2008 | Joy et al. | |
| 2008/0307343 A1 * | 12/2008 | Robert et al. | 715/765 |
| 2009/0002366 A1 * | 1/2009 | Kanitsar et al. | 345/419 |
| 2009/0085911 A1 * | 4/2009 | Fitzmaurice et al. | 345/419 |
| 2009/0113352 A1 * | 4/2009 | Gotcher et al. | 715/854 |
| 2009/0150832 A1 | 6/2009 | Keller et al. | |
| 2009/0164439 A1 * | 6/2009 | Nevins | 707/3 |
| 2009/0187849 A1 * | 7/2009 | Rhee et al. | 715/781 |
| 2009/0307623 A1 * | 12/2009 | Agarawala et al. | 715/765 |
| 2010/0306708 A1 * | 12/2010 | Trenz et al. | 715/853 |
| 2010/0325575 A1 * | 12/2010 | Platzer et al. | 715/781 |
| 2010/0333017 A1 | 12/2010 | Ortiz | |
| 2011/0029907 A1 | 2/2011 | Bakhash | |
| 2011/0193857 A1 * | 8/2011 | Filippov et al. | 345/419 |
| 2011/0234480 A1 * | 9/2011 | Fino et al. | 345/156 |
| 2011/0289459 A1 | 11/2011 | Athans et al. | |
| 2011/0310088 A1 | 12/2011 | Adabala et al. | |
| 2012/0005228 A1 | 1/2012 | Singh | |
| 2012/0054687 A1 * | 3/2012 | Kawabata | 715/836 |
| 2012/0084688 A1 * | 4/2012 | Robert et al. | 715/769 |
| 2012/0127156 A1 | 5/2012 | Goossens et al. | |
| 2013/0047123 A1 * | 2/2013 | May et al. | 715/834 |
| 2013/0132375 A1 | 5/2013 | Jones et al. | |
| 2013/0173720 A1 | 7/2013 | Vasudev et al. | |
| 2013/0179810 A1 | 7/2013 | Lim | |
| 2013/0215115 A1 | 8/2013 | Jenkins | |
| 2013/0218688 A1 * | 8/2013 | Roos | 705/14.69 |
| 2013/0227449 A1 | 8/2013 | Brown | |
| 2013/0232417 A1 | 9/2013 | Hunleth et al. | |
| 2013/0249906 A1 | 9/2013 | Gunderson et al. | |
| 2013/0278631 A1 | 10/2013 | Border et al. | |
| 2013/0311887 A1 | 11/2013 | Nankani | |
| 2013/0326424 A1 | 12/2013 | Queric | |
| 2013/0332494 A1 | 12/2013 | Brown et al. | |
| 2013/0342537 A1 * | 12/2013 | Vorhies | 345/428 |
| 2013/0345962 A1 | 12/2013 | van Os et al. | |
| 2013/0345975 A1 | 12/2013 | Vulcano et al. | |
| 2013/0345980 A1 | 12/2013 | van Os et al. | |
| 2014/0002582 A1 | 1/2014 | Bear et al. | |
| 2014/0009562 A1 | 1/2014 | Hedge et al. | |
| 2014/0040753 A1 | 2/2014 | Garcia | |
| 2014/0046983 A1 * | 2/2014 | Galloway et al. | 707/798 |
| 2014/0063061 A1 | 3/2014 | Reitan | |
| 2014/0108981 A1 | 4/2014 | Payzer et al. | |
| 2014/0146046 A1 | 5/2014 | Coombe et al. | |
| 2014/0184592 A1 * | 7/2014 | Belcher | 345/420 |
| 2015/0040073 A1 * | 2/2015 | Barcay et al. | 715/850 |

OTHER PUBLICATIONS

Mehrnaz Sadat Akhavi et al., "3D Visualization of Hierarchical Clustered Web Search Results", Computer Engineering Department, Amirkabir University of Technology, Tehram, Iran Computer Engineering Department, Iran University of Science and Technology, Tehran, Iran, 2007, 6 pages.

Cassia Trojahn dos Santos, et al., "AdapTIVE: An Intelligent Virtual Environment and its Application in E-Commerce", Master Program in Applied Computing, Unisinos University, Proceedings of the 28th Annual International Computer Software and Applications Conference, 2004, 7 pages.

Mahfujur Rahman et al., "Algorithm for Efficiently Organizing and Searching Learning Objects in 3D Virtual Environments", Multimedia Communications Research Laboratory (MCRLab), Shool of Information Technology and Engineering (SITE), University of Ottawa, Canada, VECIMS 2006-IEEE International Conference on Virtual Environments, Human-Computer Interfaces, and Measurement Systems, La Coruna—Spain, Jul. 10-12, 2006, 5 pages.

Minna Pakanedn, et al. "Studying Four 3D GUI Metaphors in Virtual Environment in Tablet Context", Visual Design and Early Phase User Experience Evaluation, ACHI 2013: the Sixth International Conference on Advances in Computer-Human Interactions, pp. 41-46.

Laender, Alberto H. et al., "String Processing and Information Retrieval", 9th International Symposium, SPIRE 2002, Lisbon, Portugal, Sep. 11-13, 2002, Proceedings, ISSN 0302-9743, ISBN 3-540-.44158-1, Springer-Verlag Berlin Heidelberg New York, http://www.springer.de, Sep. 11, 2002, 349 pages.

Pu, Jiantao et al., "Navigation and discovery in 3D CAD repositories", Published by the IEEE Computer Society, 0272-1716/07 2007 IEEE, Jul./Aug. 2007, IEEE Computer Graphics and Applications, pp. 38-47.

Samet, Hanan, "Object-based and image-based object representations", ACM Computing Surveys, vol. 36, No. 2, Jun. 2004, ACM 0360-0300/04/0600, 2004, pp. 159-217.

Wang, Wei et al., "Unified structure and content search for personal information management systems", Department of computer science, Rutgers University, EDBT 2011, Mar. 22-24, 2011 Uppsala, Sweden, ACM 978-1-4503-0528-0/11/0003, pp. 201-212.

Yeung, Minerva M. et al., "Video visualization for compact presentation and fast browsing of pictorial content", IEEE Transactions on circuits and systems for video technology, vol. 7, No. 5, Oct. 1997, pp. 771-785.

Brutzman, Don et al., "X3D: Extensible 3D Graphics for Web Authors", Series in interactive 3D technology, Morgan Kaufmann Publishers, 2007 by Elsevier Inc., pp. 1-471.

Gall, Harald et al., "Visualizing software release histories: The Use of Color and Third Dimension", Distributed Systems Group, Technical University of Vienna, Nokia Research Center, Software Technology Laboratory, 10 pages.

(56) References Cited

OTHER PUBLICATIONS

Larmore, Robert et al., "Virtual Environment for On-Campus Orientation", Department of Computer Science and Engineering, University of Nevada, Reno, NV, 89557, USA, 2005 IEEE, pp. 259-266.
Lee, Jinha et al., "Spacetop: Integrating 2D and spatial 3D interactions in a See-through desktop environment", MIT Media Laboratory, Microsoft Applied Sciences Group, Chi 2013, Apr. 27-May 2, 2013, Paris, France, Copyright (c) 2013 ACM 978-1-4503-1899-0/13/04, 4 pages.
Pakanen, Minna et al., "Designing for 3D user experience in tablet context", Design and Early Phase User Evaluation of Four 3D GUIs, International Journal on Advances in Intelligent Systems, vol. 5, No. 3 & 4, year 2013, http://www.iariajournals.org/intelligent_systems/, 2013 (c) copyright by authors, Published under agreement with, pp. 266-278.
Pakanen, Minna et al., "Studying four 3D GUI metaphors in virtual environment in tablet context", ACHI 2013: The sixth international conference on advances in computer-human interactions, Visual design and early phase user experience evaluation, Copyright (c) IARIA, 2013, ISBN 978-1-61208-250-9, pp. 41-46.
Roberts, Charles et al., "Augmented textual data viewing in 3D visualizations using tablets", Media Arts and Technology Program UC Santa Barbara, IEEE Symposium on 3D User Interfaces, Mar. 4-5, 2012, Orange County, CA, USA, pp. 101-104.
Sivic, Josef et al., "Creating and exploring a large photorealistic virtual space", Inria, Willow Project, Laboratoire d' Infomatique de l'Ecole Normale Superieure, Paris, France, CSAIL, Massachusetts Institute of Technology, Cambridge, MA 02139, USA, Adobe Research, Newton, MA, USA, 2008 IEEE, 8 pages.
Yang, Yanlin et al., "TOUGHVISUAL: A Friendly Graphical User Interface for Building Toughreact Models Under Complex 3d Geological Environments", Key Laboratory of Groundwater Resources and Environment, Ministry of Education, Jilin University, Changchun, 130021 China, 2013 The Authors—Published by Atlantis Press, pp. 93-102.
Keith Andrews, et al., "Towards Rich Information Landscapes for Visualising Structured Web Spaces", Institute for Information Processing and Computer Supported New Media, IEEE 0-8186-7668-X/96, 1996, 3 pages.
Auber, David et al., "Gosper Map: Using a Gosper Curve for Laying out Hierarchical Data", IEEE Transactions on Visualization and Computer Graphics, vol. 19, No. 11, Nov. 2013, Published by the IEEE Computer Society, 1077-2626/13, 2013 IEEE, 13 pages.
Brath, Richard et al., "Sphere-Based Information Visualization: Challenges and Benefits", Oculus Info, Inc., Toronto, Canada, 2012, 16th International Conference on Information Visualization, 1550-6037/12, 2012 IEEE DOI 10.1109/IV.2012.11, 6 pages.
Brivio, Paolo et al., "Browsing Large Image Datasets Through Voronoi Diagrams", IEEE Transactions on Visualization and Computer Graphics, vol. 16, No. 6, Nov./Dec. 2010, Published by the IEEE Computer Society., 10 pages.
Calitz, Andre P. et al., "Representation of Hierarchical Structures in 3D Space", Department of Computer Science and Information Systems, University of Port Elizabeth, P.O. Box 1600, Port Elizabeth 6000, South Africa, ACM 2001, 1-58113-446-0/01/11, 6 pages.
Chen, Shenchang E., "QuickTime VR—An Image-Based Approach to Virtual Environment Navigation", Apple Computer, Inc., 1995, ACM 0-89791-701-4/95/008, 10 pages.
Javed, Waqas et al., "Stack Zooming for Multi-Focus Interaction in Time-Series Data Vizualization", Purdue University, http://www.piccolo2d.org, Mar. 2, 2010, 8 pages.
Nguyen, Tien N. et al., "A Novel Visualization Model for Web Search Results", IEEE Transactions on Visualization and Computer Graphics, vol. 12, No. 5, Sep./Oct. 2006, published by the IEEE Computer Society., 8 pages.
Rapley, Martin H. et al., "Three Dimensional Interface for an Object Oriented Database", Computer Studies Department, Napier University 219 Colinton Road, Edinburgh, EH14 1DJ, Jan. 1, 1995, 25 pages.
Schmidt, Ryan et al., "Sketching, Scaffolding, and Inking: A Visual History for Interactive 3D Modeling", NPAR 2007, San Diego, California, Aug. 4-5, 2007, ACM 978-159593-624-0/07/0008, 10 pages.

\* cited by examiner

Classification and systematics

Acrocanthosaurus is in the Allosauroidea within the. This superfamily is characterized by paired ridges on the nasal and lacrimal bones on top of the snout and tall neural spines on the neck vertebrae among other features <ref name=holtzetal2004/> it was originally placed in the family Allosauridae with Allosaurus, <ref name=stovallangston1950/> an arrangement also supported by studies as late as 2000 <ref name=curriecarpenter2000/> Most studies have found it to be a member of the related family Carcharodontosauridae <ref name=holtzetal2004/><ref name=brusatteetal2009></ref><ref name=bensonetal2010></ref>

At the time of its discovery, Acrocanthosaurus and most other large theropods were known from only fragmentary remains, leading to highly

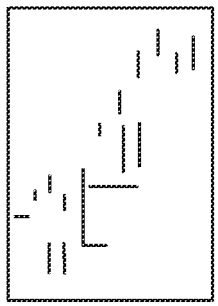

FIG. 8C

THREE-DIMENSIONAL SPACE FOR NAVIGATING OBJECTS CONNECTED IN HIERARCHY

CROSS-REFERENCE TO RELATED APPLICATIONS

This application claims priority to U.S. Application No. 61/800,839, entitled "THREE-DIMENSIONAL SPACE FOR NAVIGATING OBJECTS CONNECTED IN HIERARCHY", filed Mar. 15, 2013, of which the full disclosure of this application is incorporated herein by reference for all purposes.

BACKGROUND

1. Technical Field

The present disclosure relates to navigating content and more specifically to three-dimensional navigation of content.

2. Introduction

The traditional paradigm for accessing content involves viewing a file structure of objects such as a directory tree, selecting an object, and viewing the object in a discrete frame or window. According to this paradigm, a user only sees either the file structure or the content itself. Indeed, the user cannot view the content at the same time he views how the content is related to all the other content in the file structure.

Additionally, humans are comfortable and familiar with navigating their surroundings with reference to three dimensions of space. However, the paradigm for accessing content is strictly two-dimensional.

What is needed is a three-dimensional spatial zooming user interface for navigating content in three dimensions while observing how the content relates to other content.

SUMMARY

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Disclosed are systems, methods, and non-transitory computer-readable storage media for browsing objects organized in a hierarchy using a three-dimensional user interface. Some embodiments of the present technology involve a platform that renders a three-dimensional interface that represents objects that are hierarchically connected in three-dimensional space and that allows navigation through the hierarchy by moving through the three-dimensional space.

Some embodiments involve dynamically adjusting the level of detail of one or more objects as the user interface moves towards or away from the objects.

Some embodiments of the present technology involve navigation rules for translating user inputs into selection inputs, zoom inputs, look inputs, orbiting inputs, etc. Similarly, some embodiments involve enforcing navigational constraints.

Some embodiments of the present technology involve the platform rendering an interactive portal in the interface for moving from one portion of the interface to a discrete, non-directly connected portion of the interface.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which:

FIG. 8C illustrates a representation of the document object being viewed after a user further zooms in on the object according to some embodiments of the present technology;

DETAILED DESCRIPTION

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

The present disclosure addresses the need in the art for interfaces that allows user to navigate through a hierarchy of large sets of data in a three-dimensional interface. Systems, methods, and non-transitory computer-readable media are disclosed which enable user to browse objects that are hierarchically connected in three-dimensional space and that allows navigation through the hierarchy by moving through the three-dimensional space.

Three-dimensional Spatial Zooming User Interface/Platform

Figure 1:
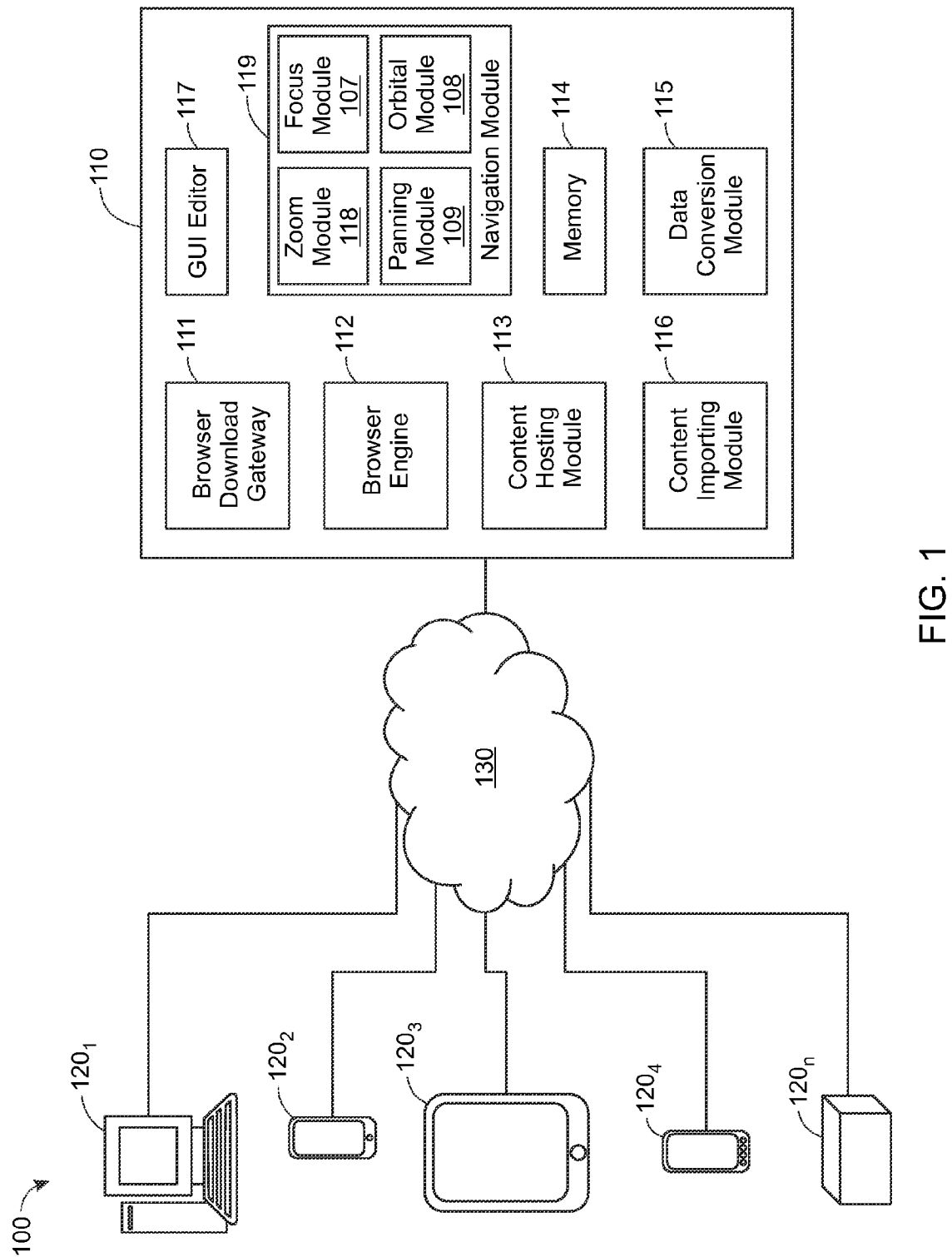
FIG. 1 illustrates a system for providing a three-dimensional interface for browsing a hierarchy of content and the content itself according to some embodiments of the present technology.

FIG. 1 illustrates a system 100 for providing a three-dimensional interface for browsing a hierarchy of content and the content itself according to some embodiments of the present technology. The system includes a network-based platform 110 that can be accessed by a plurality of client devices $120_1$, $120_2$, $120_3$, $120_4$, $120_n$ via one or more network 130.

In some embodiments, the platform 100 can store browser application data in a memory device 114 and can include a browser download gateway 111 configured for offering the client devices $120_1$, $120_2$, $120_3$, $120_4$, $120_n$ a downloadable client side three-dimensional browser application. The platform 100 can also include a browser engine 112 that can be configured to render a three-dimensional user interface.

The browser engine 112 can render a GUI with data nodes appearing in three-dimensional space and with layers of sub-data nodes and super-data nodes in positions around the data node to indicate a hierarchal relationship between the data nodes. The relative size of the data nodes, sub-data nodes, and super-data nodes can indicate the nodes' hierarchical relationships with each other. For example, a larger data node can indicate a parent relationship to one or more smaller nodes.

The platform 110 can include a navigation module 119 that can work with the browser engine 112 to interpret input gestures as navigational inputs and to enforce navigational constraints. The navigation module 119 can include one or more sub-modules including a focus module 107, a look module 109, an orbital module 108, and a zoom module 118.

The zoom module 118 can be configured to accept zoom commands from a user and cause the interface to move along a depth perspective. The zoom module 118 can be configured to scale the appearance of data nodes according to the zoom commands. For example, as an interface zooms in toward a data node, the data node can scale to become larger, and vice versa. The zoom module 118 can also be configured to display and undisplay data nodes at predetermined threshold zoom limits. For example, as an interface is zoomed into to a predetermined sub-node limit on a depth axis, a sub-data node can be displayed. At the same time, the data node can become larger due to the interface zooming in. Likewise, as an interface is zoomed out, the data node can become smaller and the sub-data nodes can be undisplayed once the interface is zoomed out past the sub-node limit. Also, continued zooming out can cause the interface to be zoomed out past a super-node limit such that the parent node of the original data node can be displayed—with the original node becoming smaller and the super-node appearing larger due to their relative positions on the depth axis.

The focus module 107 can be configured to accept a selection command to focus on a data node and translate the interface to locate the focused-on node to be in substantially the center of the interface at a predetermined scale. The look module 109 can be configured to rotate the interface about an axis in a direction of a look input. The look axis can be orthogonal to the depth axis that is referenced by the zoom module 118. The orbital module 108 can be configured to accept an orbital command and can rotate the interface about a selected data node in response to an orbital command input. The rotation from the orbital module is often constrained to follow the contour shape of the selected data node to for example yield planar panning motion if for example the contour shape is a plane such as a photograph.

Additionally, nodes that have previously been the subject of focus by the focus module 107 can form a history that is stored in memory. The browser engine 112 can interpret forward and back inputs from a keyboard, touchscreen, etc. as instructions that allow users to navigate this history enabling rapid forward and back tracking through paths that the user took through the space of visited nodes. Rapid multiple clicking of forward or back will concatenate node transitions. For example, in some embodiments, a rapid three clicks of back button would not step by step go back through each node the navigator visited, but instead navigate directly to the third historical node.

Similarly, sections of navigation history can be edited with an interface element to form documentaries that journal spatial navigation paths through the three-dimensional space. These documentary journals can be further edited and marked up to add text, audio and animation to make rich presentations of content in both two- and three-dimensional space. These documentaries can take the viewer on any path that the navigator can navigate including through portals and re-parenting operations, as discuss in greater detail below.

The platform 100 can also include one or more modules that support the client side browser application, host content, import content, convert content for displaying in the three-dimensional browser, etc. In some embodiments, the platform 100 includes a content hosting module 113, a content importing module 115, a content importing module 116, and a GUI editor 117. In some embodiments of the present technology, the GUI editor 117 can allow developers to program using the three-dimensional markup protocol described herein.

In some embodiments, the content importing module 117 is configured to ingest content and the data conversion module 115 is configured to analyze the imported content to determine how data objects are connected to one another.

The three-dimensional browser defines a new form of three-dimensional interface that can be used to present large sets of data, show a hierarchal relationship between objects, and view sets of object or individual objects contained in the sets of data. The browser can present and display any type of data including traditional data objects (such as documents, pictures, videos, webpages, etc.) as well as three-dimensional, platform-hosted data.

The browser improves traditional two-dimensional windows interfaces by combining elements of two-dimensional graphical user interfaces ("GUIs") with three-dimensional interface design features to implement an innovative browsing model: a three-dimensional spatial zooming user interface. The three-dimensional spatial zooming user interface enables a continuous browsing environment in which the systems of finding and accessing content and viewing the content itself are combined into one unified control interface.

Additionally, the platform 100 can be used to store and deliver a plug-in for providing the abilities of the browser engine 112 via existing browser applications.

Mark-up Trees

In some embodiments of the present technology, the platform 100 can be configured such that a potentially infinite-sized hierarchy of content can be represented in the three-dimensional spatial zooming user interface.

In some embodiments, the content displayed in a three-dimensional spatial zooming user interface can comprise both user-constructed and machine-constructed mark-up files that specify attributes describing how the content should be viewed in the browser. The mark-up files can reference traditional web content such as text, images, video, and other web content. In some embodiments, the mark-up files can include reference to content hosted on the platform, such as interactive three-dimensional content made specifically for the browser using tools and formats especially designed for hosted content or industry standard tools and formats.

Like traditional Hypertext Mark-up Language, which is a simple mark-up system that allows one set of content (e.g. a website) to reference other content, images and videos stored elsewhere on the internet and decide how to present them, some embodiments of the present technology involves using a mark-up tree system to specify how content stored on existing internet web pages can be presented within three-dimensional space.

Some embodiments of the present technology involve constructing a three-dimensional spatial zooming user interface using a hierarchal tree of mark-up files that define the content of a node as well as the nodes' relationships with one another. The mark-up tree can contain many objects (e.g. content objects, websites, etc.) in one space, enabling a relative spatial orientation and "depth based" exploration of the objects as well as being able to directly navigate between linked nodes through a representation of three-dimensional space.

Using the mark-up system and mark-up tree, designers, content providers, and individual users can also specify how the content should be presented in the three-dimensional space and can display all types of content including static objects, traditional web content, web streamed content, etc.

Three-dimensional Layout Using Mark-up Trees and a Depth Axis

As explained above, the mark-up tree defines both the content of a node and the relationship between nodes. This provides a user with the ability to browse content as well as the content hierarchy itself. Indeed, the inventors have applied this technical innovation to the fact that humans are comfortable and familiar with navigating the things they reference in a three-dimensional spatial sense. Consequently, some embodiments of the present technology involve a browser that uses three dimensions for presenting the hierarchy of relationships between content items.

Using a depth axis is a convenient way to view content along with how content is organized, thereby enabling continuous content browsing through a three-dimensional visual hierarchy. The depth axis enables the browser to ability to zoom in and out of content (aka "Deep Zoom").

The Deep Zoom feature of the present technology creates a sense of infinite but comprehensible space for content to be stored in. Also, designing an interface navigator (explained below) to translate simple users input actions to the functions of zooming in and out on the depth axis makes navigation through the three-dimensional spatial zooming user interface very intuitive. Indeed, the depth axis makes it easy to find a new content area and zoom in on the new content of interest as a natural way to explore vast data sets.

Also, through human experience with three-dimensional navigation in the non-digital world, we have come to expect that objects will become clearer to us as we move physically closer to the object. Accordingly, some embodiments of the present technology also involve applying rules for representing a dynamic level of detail (aka "LOD") to facilitate a natural three-dimensional browsing experience.

Combining the innovative mark-up tree system with the concepts of three-dimensional navigation layout, Deep Zoom and a dynamic level of detail results in the present technology creating a continuous browsing paradigm.

Continuous Three-dimensional Content Browsing

Some embodiments of the present technology involve a continuous browsing paradigm having no discontinuous breaks in the visual metaphor. For example clicking on a document or an application in the traditional content navigation experience to instantly open a window is discontinuous; however, approaching objects in the continuous three-dimensional browsing interface that continuously expresses more detail and functionality is continuous. Indeed, this experience connects the act of browsing content items with viewing the content items themselves, which are traditionally handled with different systems. The separation between content and the access to the content in terms of objects (i.e. icons), directory structure, documents and data, and traditional two-dimensional controls become unified into one single paradigm. This unification allows for a much richer content interface based on increased level of detail, i.e. the closer a viewer gets to an object the more detail it can express. This allows the user to make more informed decisions about how 'deep' to go into any area of content. Accordingly, "depth" is now a new dimensional axis that can be used to decide whether or not to present objects and launch applications, as opposed to the binary on/off model of an application running or not.

For example, in some embodiments, as a user navigates around a three-dimensional space, the browser engine can pre-cache content in a virtual sphere around a user's current point of view in the three-dimensional space such that nearby content is seamlessly loaded regardless of a direction that the user navigates in the space. In some embodiments, the browser engine can define the size of the virtual sphere based on any number of factors including available processing resources, network bandwidth, available memory resources, etc.

In some embodiments, as a user navigates towards an object that represents an executable file (e.g. an application), the browser engine can apply rules for determining when and how to present the application. For example, from a virtual far away distance, an application can be represented by a simple spherical node. However, as a viewer virtually approaches the application, the browser engine can display application artwork. When the viewer is even closer, the browser engine can load further detail or code and can launch a lite version of the application. Finally, once the viewer is close enough (as defined by heuristics in the browser engine, the application, or both) the browser engine can launch the full version of the application.

Additionally, content can be laid out and navigated more intuitively and usefully in a three-dimensional spatial metaphor. This allows large spaces to store and arrange content, and for users to locate and discover that content. The removal of the above-mentioned 'discontinuity' allows the content itself to be laid out in space—rather than using icons representing the content in file windows. Similarly, media unification allows the multitude of media types that users can access to exist within the same continuous three-dimensional space without the need for mere iconic representations on a desktop or in a file browser.

Additionally, a three-dimensional spatial zooming user interface can enable continuous browsing within multiple disjointed three-dimensional spaces (e.g. content that is disjointed in terms of being physically and visually disjointed through a large separation in the mark-up tree). Browsing between disjointed content can be facilitated using portals and re-parenting as described in more detail below.

Figure 2A:
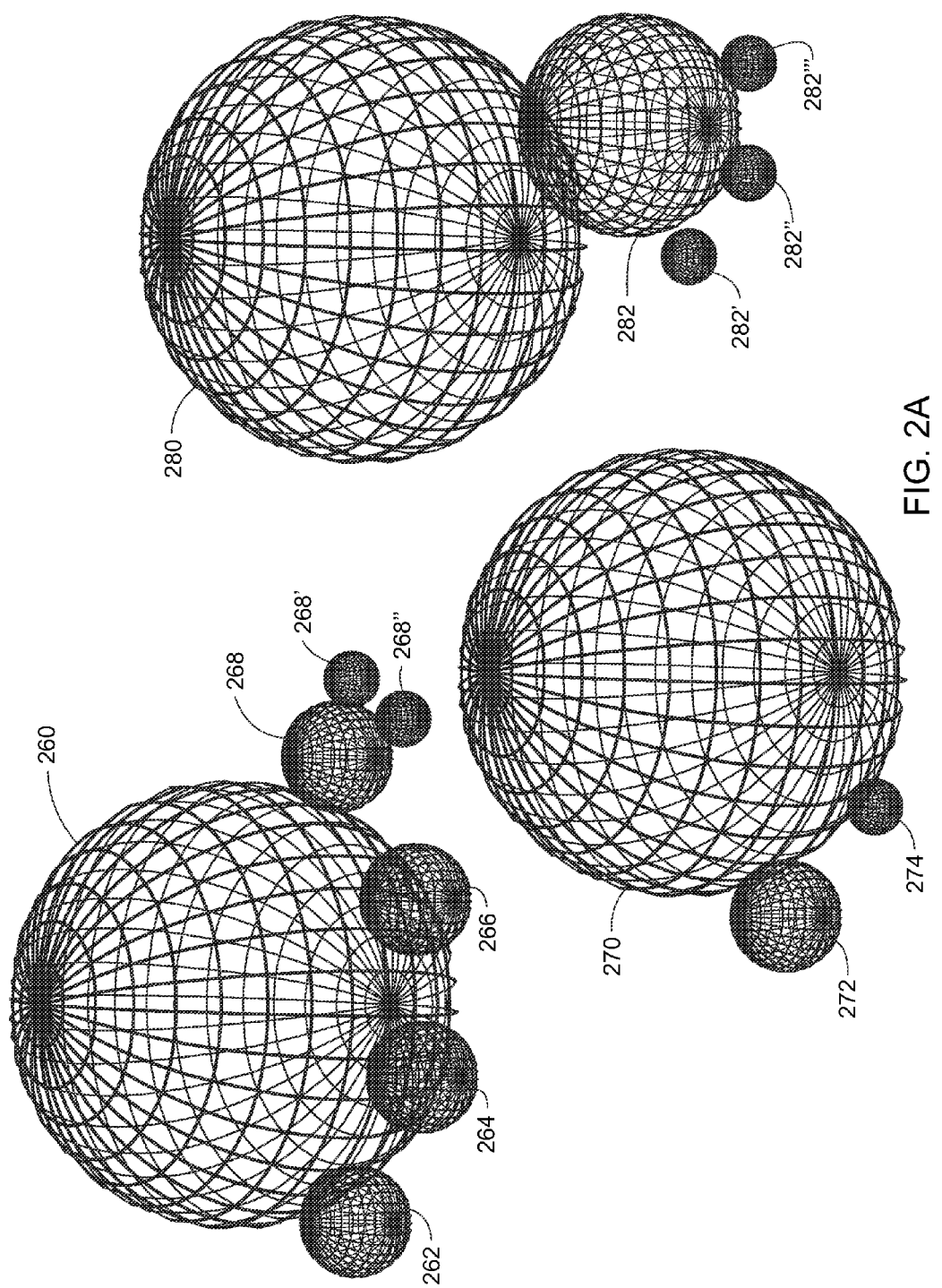
FIG. 2A illustrates an exemplary representation of a plurality of objects represented as nodes of a three-dimensional space.
Figure 2B:
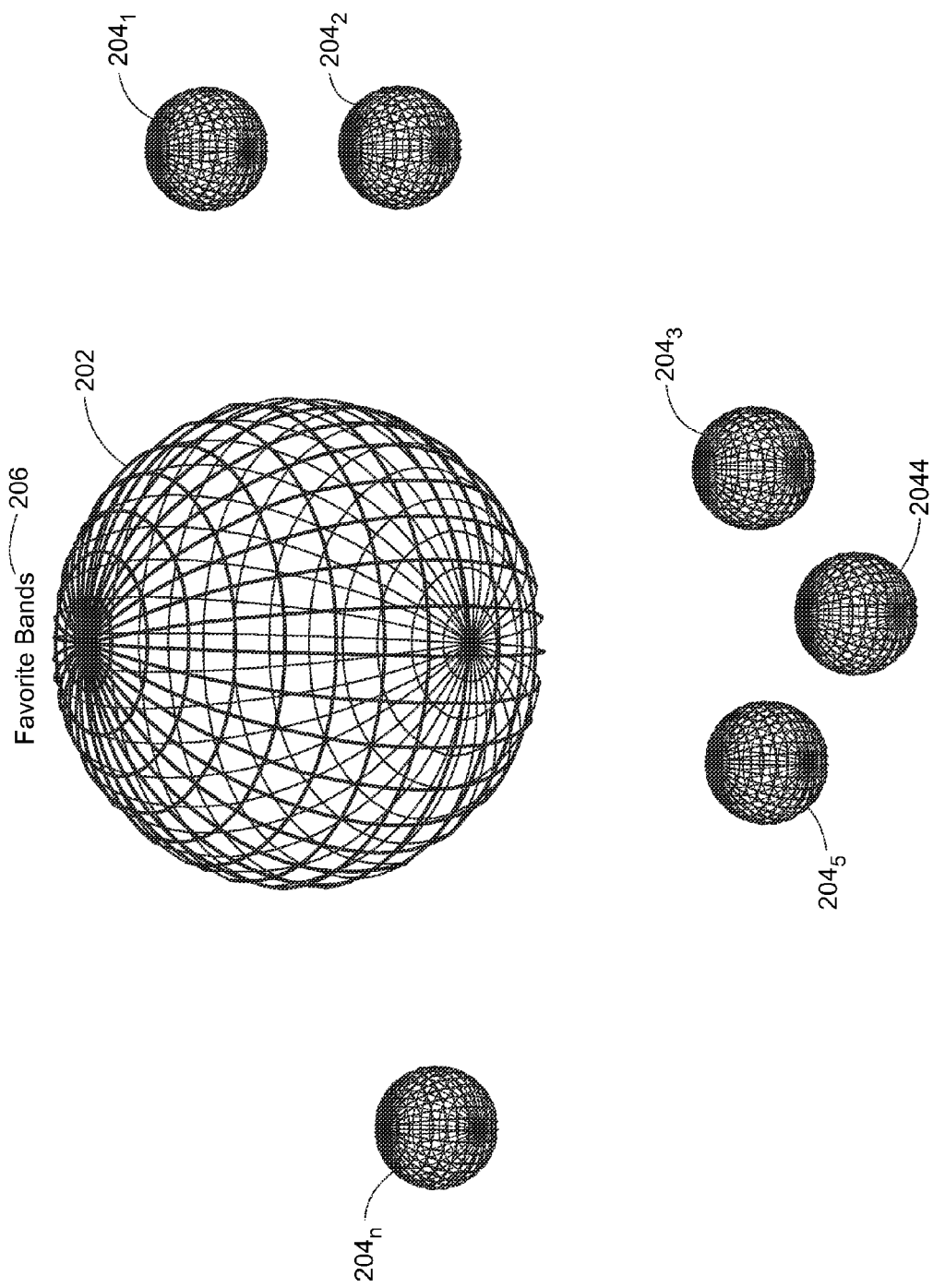
FIG. 2B illustrates an exemplary representation of a subset of a three-dimensional space.
Figure 2C:
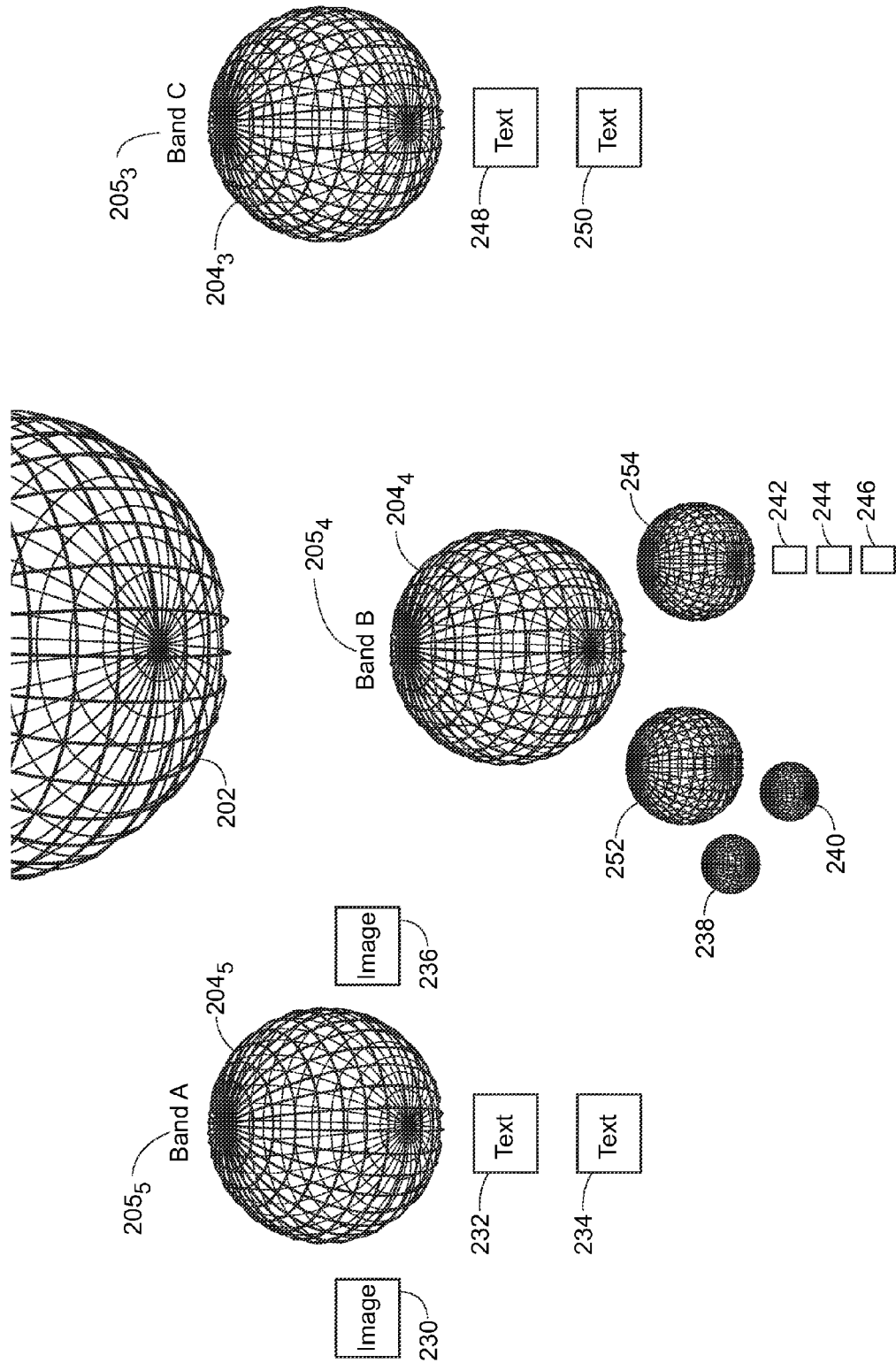
FIG. 2C illustrates an exemplary representation of a group of child nodes orbiting a parent node that have been zoomed in upon.

FIGS. 2A-2C illustrate a series of representations of a digital space being navigated using a three-dimensional spatial zooming user interfaces according to some embodiments of the present technology.

FIG. 2A illustrates a high-level view of a three-dimensional spatial zooming interface having multiple disconnected parent nodes 260, 270, 280 according to some embodiments of the present technology. As shown in FIG. 2A, parent node 260 is hierarchically connected with child nodes 262, 264, 266, and 268. Likewise, child node 268 is hierarchically connected with grandchild nodes 268', 268". Similarly, parent node 270 is hierarchically connected with child nodes 272 and 274 and parent node 280 is hierarchically connected with child nodes 282 and grandchild nodes 282', 282", and 282'".

Further descendent nodes (great grandchild nodes, etc.) can be hierarchically connected with one or more of the nodes and can remain invisible until a viewer zooms close enough to the descendent node to cause the browser engine to change their level of detail and become visible (as explained below). In some embodiments of the present technology, the size, shape, color, etc. of the nodes, child-nodes, etc. can convey meaning to a viewer.

FIG. 2B illustrates an exemplary representation of a subset of a three-dimensional space. As shown in FIG. 2B, a parent node 202 is associated with a label 206 describing the content organized around it. Also, the parent node 202 is orbited by child nodes $204_1$, $204_2$, $204_3$, $204_4$, and $204_n$. These child nodes $204_1$, $204_2$, $204_3$, $204_4$, $204_5$, and $204_n$ are intentionally somewhat difficult to see given their relative distance away on the depth axis; however, as a user navigates towards one or more of the child nodes, they (and their labels) will become clearer. Additionally, the asymmetric orientation of the child nodes $204_1$, $204_2$, $204_3$, $204_4$, $204_5$, and $204_n$ around the parent node 202 illustrates that the content associated with the child nodes $204_1$, $204_2$, $204_3$, $204_4$, $204_5$, and $204_n$ are not simply spaced, but intentionally organized using a mark-up language/mark-up tree system.

FIG. 2C illustrates an exemplary representation of a group of child nodes $204_2$, $204_3$, $204_4$ orbiting a parent node 202 that have been zoomed in upon. Indeed, the representation of the space in FIG. 2C can result in a user selecting (using a mouse click, finger tap, etc.) one or more of child nodes $204_3$, $204_4$, $204_5$. As is now expected in the three-dimensional spatial zooming user interface browser model, the level of detail of the child nodes $204_3$, $204_4$, $204_5$ is now greater than in FIG. 2B. Also, labels $205_3$, $205_4$, $205_5$ describing the child nodes $204_3$, $204_4$, $204_5$ are now more discernable.

Additionally, the child nodes $204_3$, $204_4$, $204_5$ are orbited by one or more grandchild nodes 230, 232, 234, 236, 248, 250, 252, 254, some of which can be content items. Likewise, the grandchild nodes 252, 254 can be orbited by one or more (smaller and less discernable) content item nodes 242, 244, 246, sub-nodes 238, 240, or both.

In some embodiments of the present technology, sub-nodes can be arranged around a primary node in a plurality of orientations.

Additionally, some embodiments involve a GUI editor module configured to allow users, designers, content providers, etc. to design how content orbits or is otherwise orientated around a node.

FIGS. 3A-3D illustrate a series of representations of objects oriented in digital space being navigated using a three-dimensional spatial zooming user interfaces according to some embodiments of the present technology.

Figure 3A:
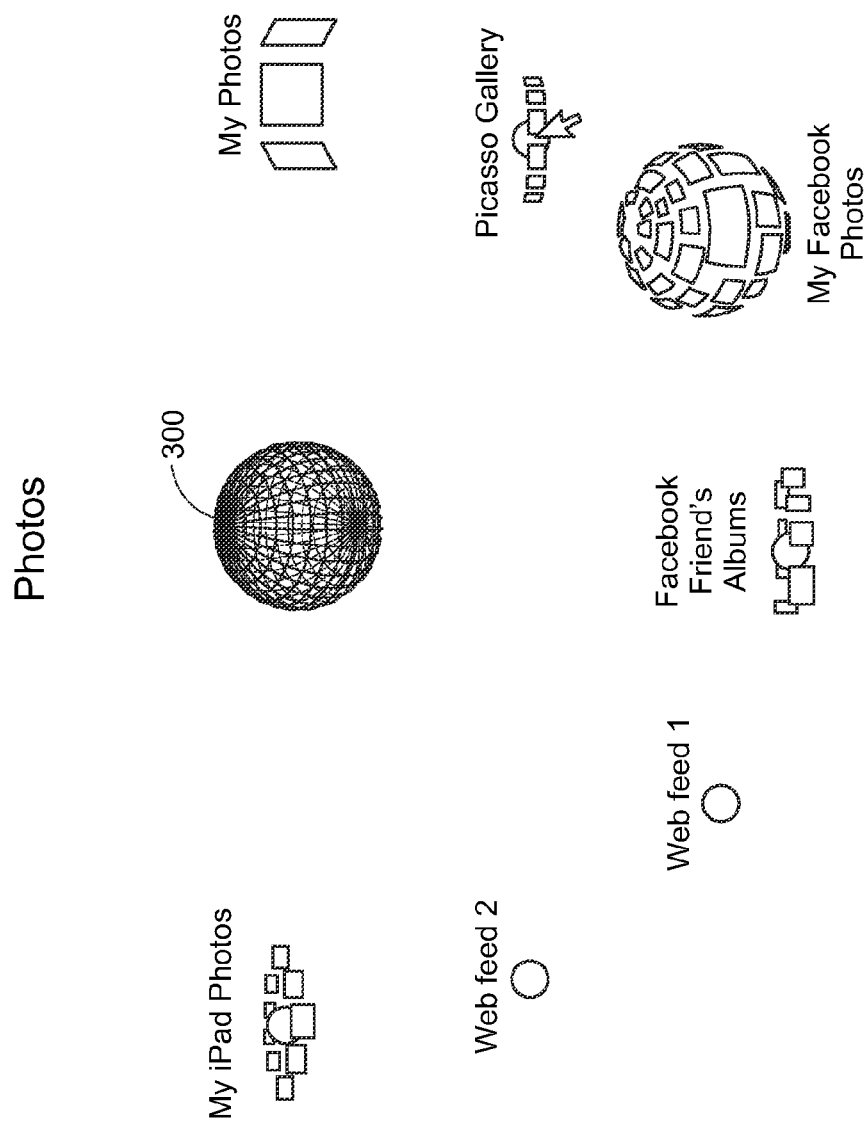
FIG. 3A illustrates an exemplary representation of a node in a three-dimensional spatial zooming user interface representing a collection of photos from a plurality of sub-node sources.

FIG. 3A illustrates an exemplary representation 300 of a node in a three-dimensional spatial zooming user interface that is orbited by collections of photo nodes from a plurality of sub-node sources. As shown, the various sub-nodes organize content items in various ways. For example, content nodes can be arranged in a line, in an orbiting ring around a node, in an orbiting ring without a node represented, as a spherical ball around a node. FIG. 3D illustrates exemplary arrangements for organizing content item nodes according to some embodiments of the present technology. According to FIG. 3D, a group of content item nodes 350 are arranged in a ring orbit around a central node 351 that can be labeled to describe the content items. Another group 360 of content item nodes can be arranged in a ring orbit without the presence of a central node. In this case, the outer circumference or the center of the ring can act as the sub-node for the purposes of flocking and bumpers, as explained below. Another group 370 of sub-sub-nodes can be arranged in a ring orbit around a central sub-node 371. Also, as shown in FIG. 3D, a plurality of content item nodes 380 can be arranged in a shell-type orbit.

Figure 3B:
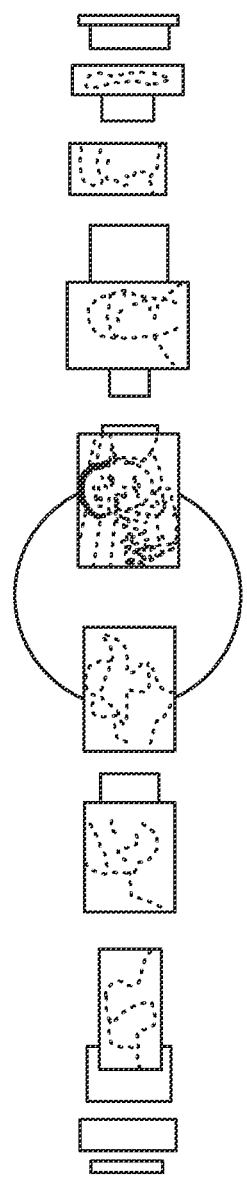
FIG. 3B illustrates an exemplary representation of a sub-node with photo objects arranged in an orbiting ring around the sub-node.
Figure 3C:
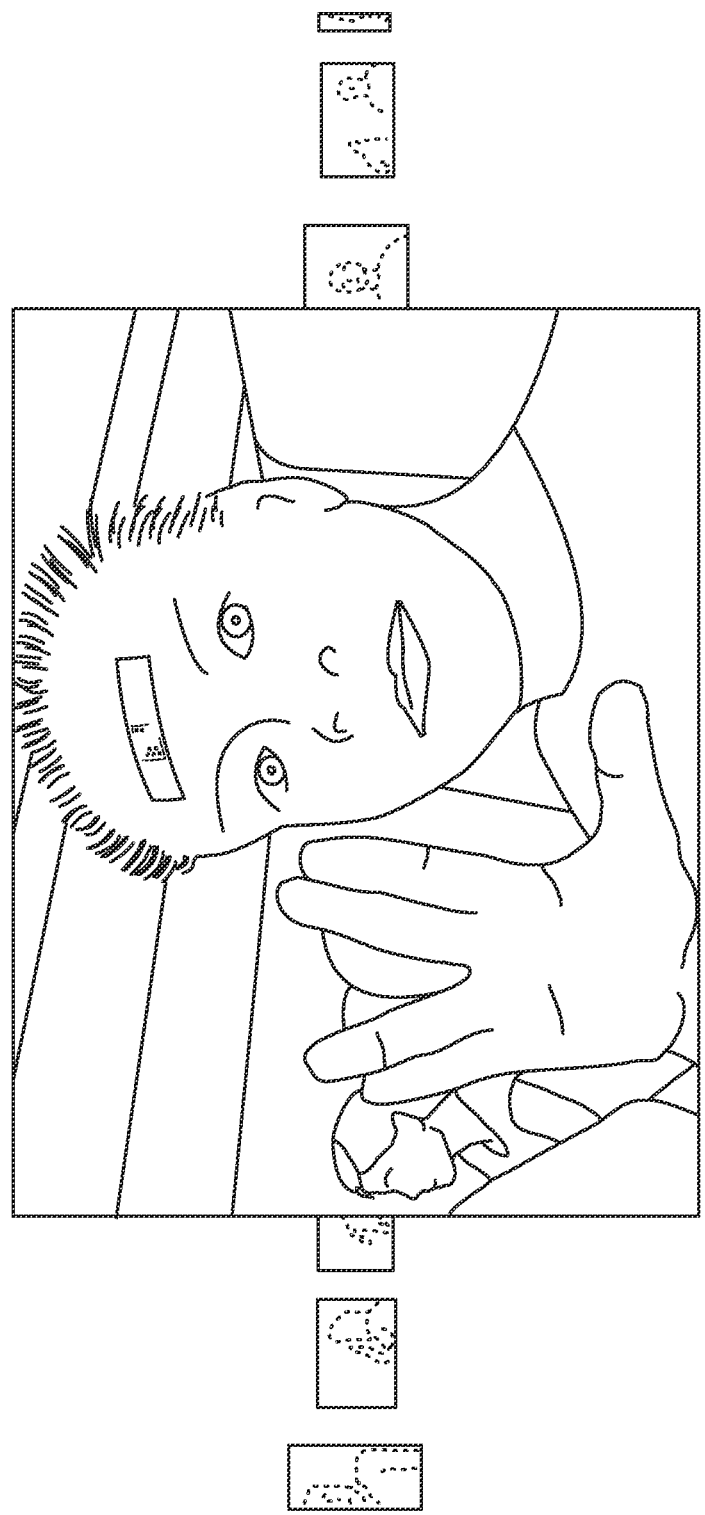
FIG. 3C illustrates an exemplary representation of a sub-node with photo objects arranged in an orbiting ring around the sub-node.
Figure 3D:
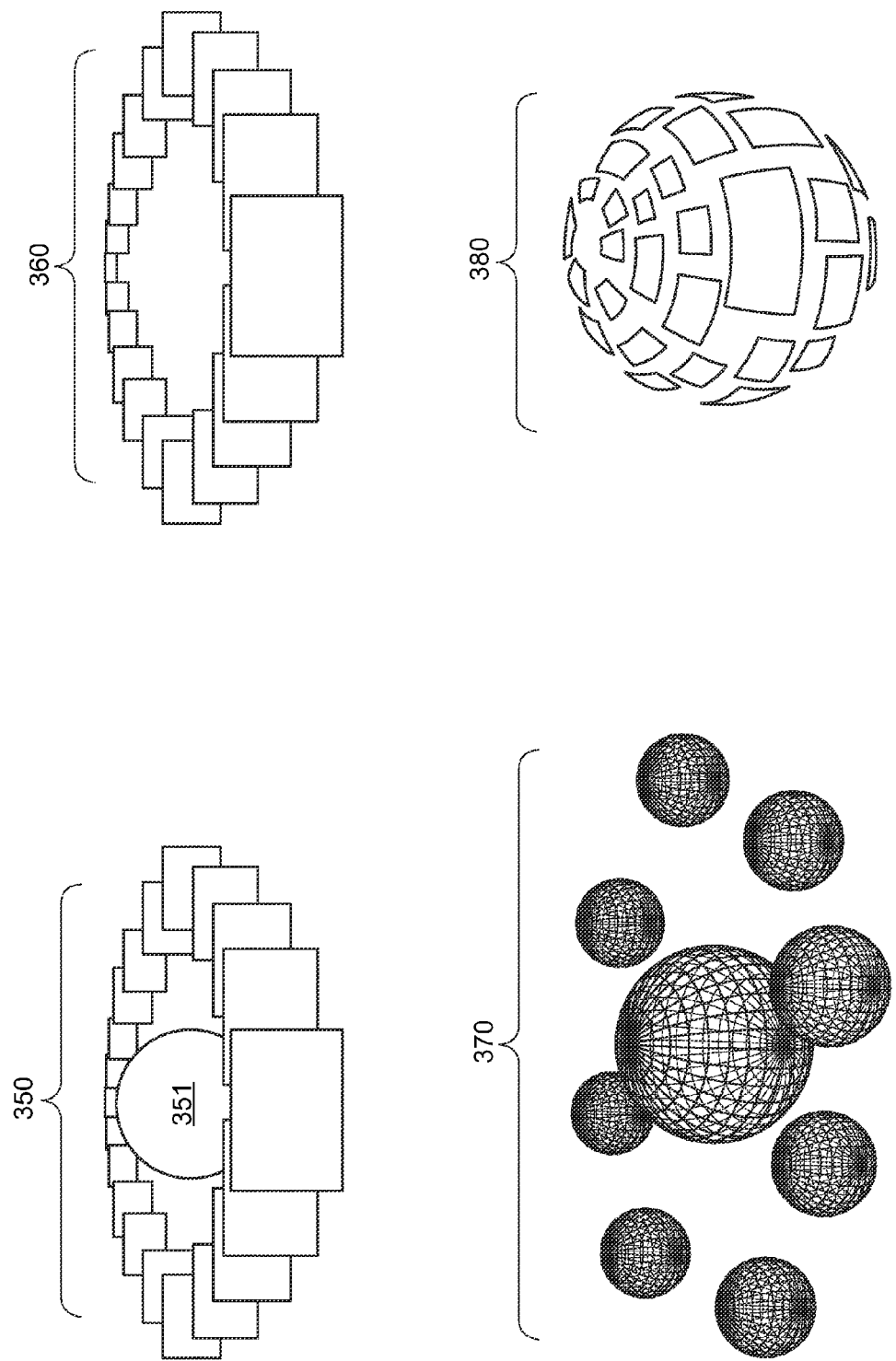
FIG. 3D illustrates exemplary arrangements for organizing content items according to some embodiments of the present technology.

FIGS. 3B and 3C illustrate exemplary representations of a sub-node with photo objects arranged in an orbiting ring around the sub-node. According to FIG. 3B, the level of detail of the photo objects is relatively low. However, FIG. 3C illustrates the same orbiting ring zoomed in upon. As shown, the level of detail of the photo objects is greater.

As explained herein, users can navigate through the three-dimensional spatial zooming user interface by zooming in and out of content. Additionally, users can navigate using inputs to select content, translate or orbit the interface, rotate objects, etc.

Three-dimensional Spatial Zooming User Interface/Navigator

Some embodiments of the present technology involve a three-dimensional spatial zooming user interface browser engine 112 and the navigation module 119 (aka "the Navigator") to provide simple and intuitive navigation of the three-dimensional space.

In some embodiments of the present technology, the Navigator is the part of the browser that enables simple and natural movement by the user around the three-dimensional spatial zooming user interface. The user enters all control inputs via the Navigator. Also, the Navigator is intelligent in that it understands the content types being viewed and can modify its movement and behavior based on content type, thereby delivering a natural feeling for the navigation of that content type. Below are listed various exemplary inputs and a description of their navigational action.

Zooming

As explained above, zooming inputs cause the Navigator to move the user towards or away from the selection. A wide variety of inputs can be used for zooming including a mouse wheel rotation and a touchscreen pinch.

Look

A look input causes the Navigator to cause the interface to look towards or away from the selection in a specified direction. A wide variety of inputs can be used for look, including a mouse second button click and drag and a touchscreen two finger drag.

Selection

The user can select a node in the three-dimensional spatial zooming user interface. The Navigator takes the user to the selection, which becomes the target object. Thereafter, other actions, such as zooming and editing, are applied to the current selection. A wide variety of selection inputs can be used for selection including a mouse click and a touchscreen single tap.

Figure 4A:
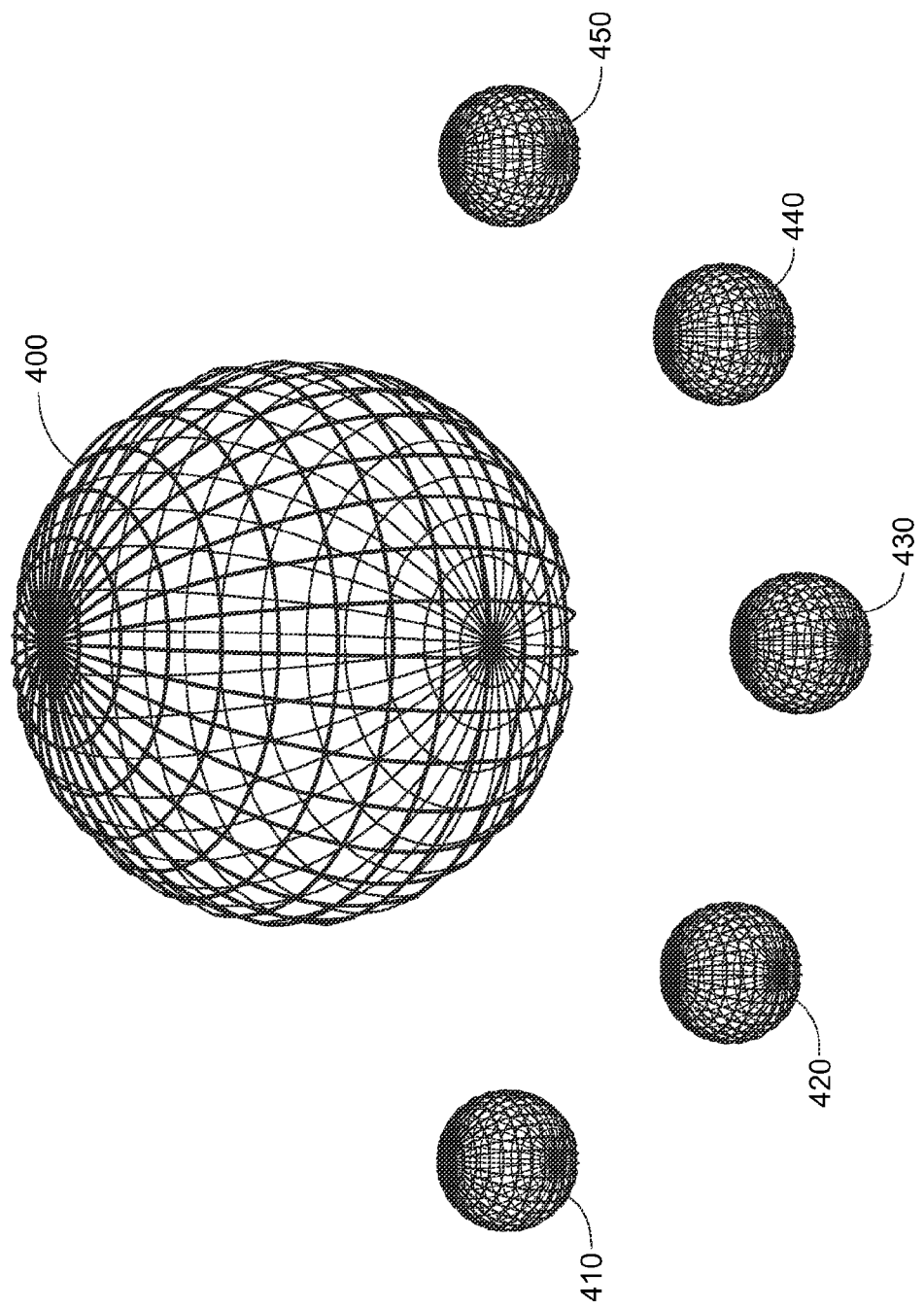
FIG. 4A illustrates an exemplarily three-dimensional spatial zooming user interface before receiving a user input and automatically rotating, translating and zooming according to some embodiments of the present technology.
Figure 4B:
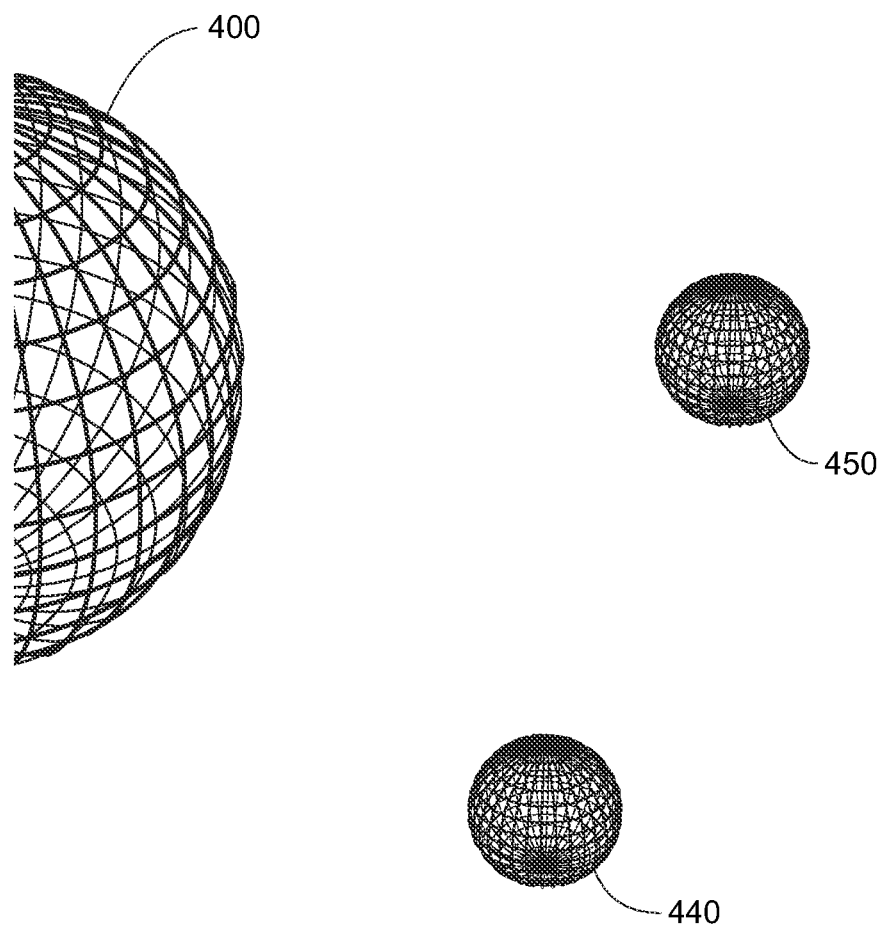
FIG. 4B illustrates the exemplarily three-dimensional spatial zooming user interface of FIG. 4A after receiving a user input and automatically rotating, translating and zooming.

In some embodiments, selection of an object causes the Navigator to automatically rotate and translate the three-dimensional spatial zooming user interface to center the selected object and automatically zoom in on the object. FIGS. 4A-4B illustrate automatic rotation, translation and zooming upon selection of an object according to some embodiments of the present technology.

FIG. 4A illustrates an exemplarily three-dimensional spatial zooming user interface before receiving a user input and automatically rotating, translating and zooming. As shown in FIG. 4A, a node 400 is orbited by three sub-nodes 410, 420, 430, 440, 450, thereby indicating that the node 400 is hierarchically connected with the sub-nodes 410, 420, 430, 440, 450. In the event of a user selecting sub-node 450, the Navigator automatically rotates and translates to focus on sub-node 450 and zooms in on sub-node 450. FIG. 4B illustrates the exemplarily three-dimensional spatial zooming user interface of FIG. 4A after receiving a user input and automatically rotating, translating and zooming. As shown, sub-node 450 is centered and appears larger based on the interface being zoomed in upon it. Likewise, the node 400 and sub-node 440 also appear larger after the zooming.

Orbiting

An orbiting input causes the Navigator to moves the user interface around the selection. The orbiting motion can vary depending on the geometry of the selected object (see a discussion of Orbit Constraint below) and aims to be the natural way a user would want to explore around that content. A wide variety of inputs can be used for moving the orbit including a mouse click and drag and a touchscreen touch and drag.

Figure 5A:
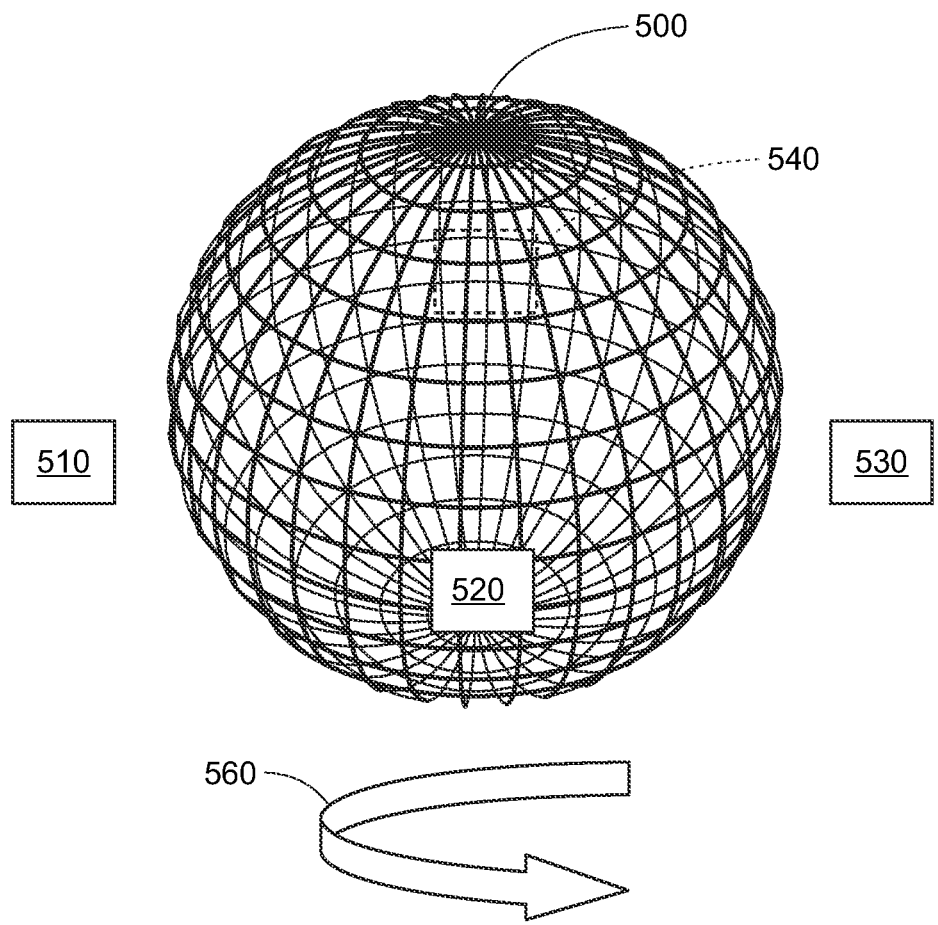
FIG. 5A illustrates an exemplarily three-dimensional spatial zooming user interface before receiving an orbiting input according to some embodiments of the present technology.
Figure 5B:
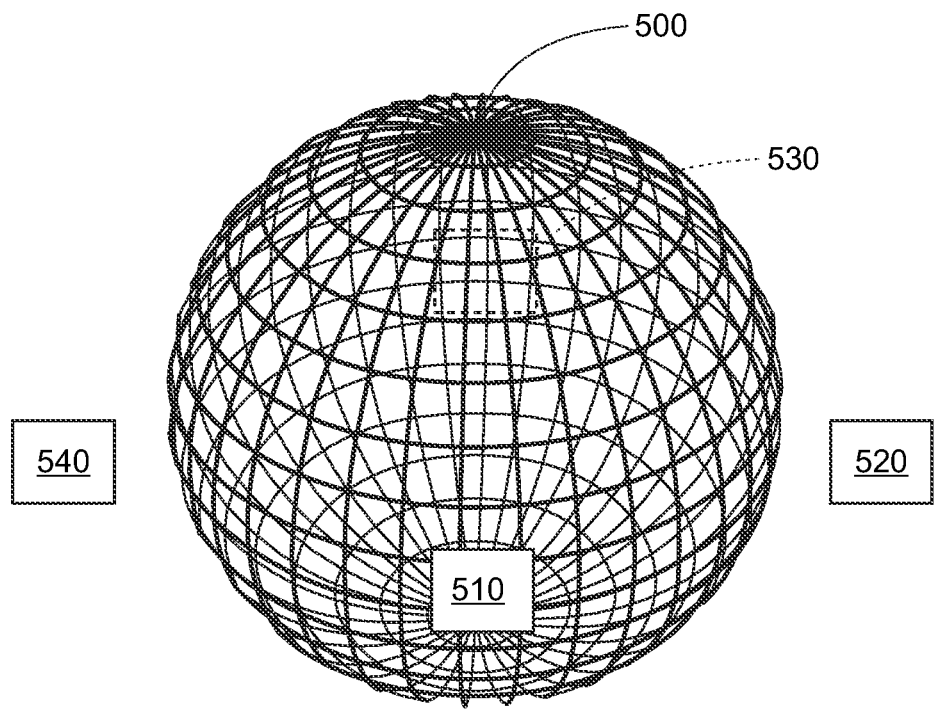
FIG. 5B illustrates the exemplarily three-dimensional spatial zooming user interface of FIG. 5A after the orbiting input.

FIGS. 5A and 5B illustrate objects orbiting around another object according to some embodiments of the present technology. FIG. 5A illustrates an exemplarily three-dimensional spatial zooming user interface before an orbiting input. The three-dimensional spatial zooming user interface of FIG. 5A includes a node 500 and a plurality of object nodes 510, 520 (located in front of the node), 530, 540 (located behind the node 500, as indicated by dashes) configured in a ring around the node 500. In the event of a user provides an orbiting input (in this case a rotational input as indicated by arrow 560), the Navigator moves around the object. FIG. 5B illustrates the exemplarily three-dimensional spatial zooming user interface of FIG. 5A after the orbiting input. Indeed, objects nodes, 510, 520, 530, 540 are now presented in a new, post-rotation configuration.

Navigation Constraints

In addition to navigation actions, the Navigator can enforce navigation constraints to provide a natural and user-friendly navigational experience of the three-dimensional spatial zooming user interface. Below are listed various exemplary navigational constraints and a description of their constraining action.

Orbit Constraint The Navigator can constrain nodes and the orbit that the user experiences with respect to the nodes. In some embodiments, orbiting comprises the three-dimensional interface moving around a selection in response to a user input (e.g. clicking and holding a mouse button and dragging the mouse, single finger placement with movement, etc.).

In some embodiments, an orbit constraint can specify how the 'orbit' motion behaves as the user tries to 'orbit around' a node. For example, orbiting around a rendition of a three-dimensional object (e.g. a planet) can rotate the Navigator completely around the object; however, if viewer is viewing a two-dimensional object (e.g. a photo), the Navigator's motion is restricted to a plane. In some embodiments, complex objects can have more complex constraints. For example, the spherical orbit of a spherical object can allow a complete orbit about the poles of the sphere, but can be constrained so as to not allow the user to orbit over the poles of the sphere.

Figure 6:
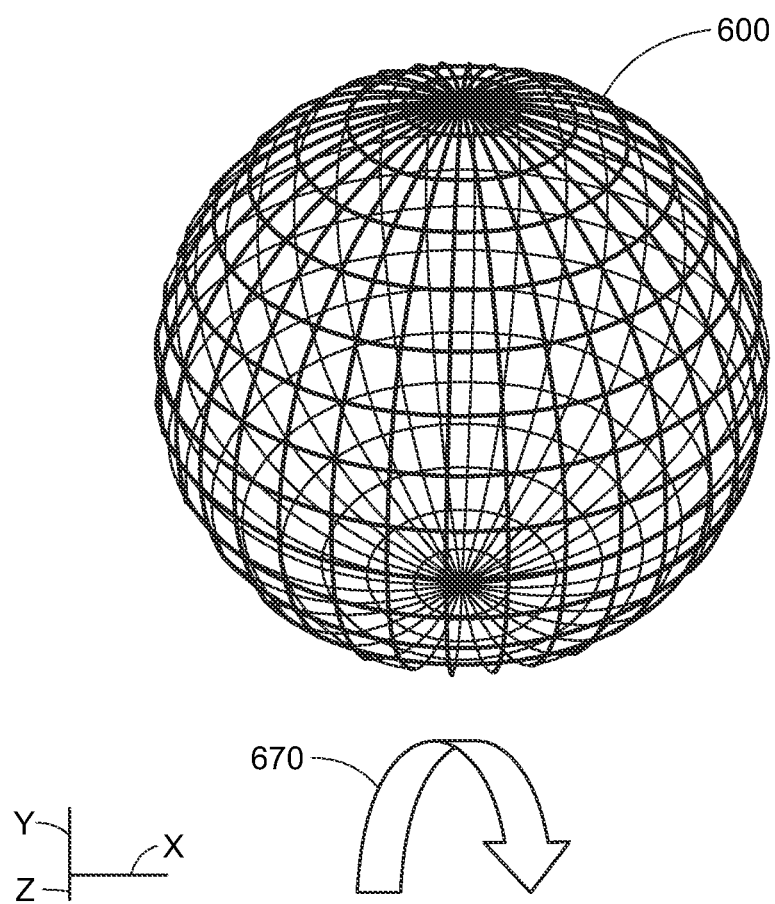
FIG. 6 illustrates an exemplarily three-dimensional spatial zooming user interface with a spherical object receiving a rotational orbiting input, but applying an orbiting constraint according to some embodiments of the present technology.

FIG. 6 illustrates an exemplarily three-dimensional spatial zooming user interface with a spherical object 600 receiving a rotational orbiting input, but applying an orbiting constraint. As indicated by arrow 670, the input comprises a downward rotational input; however, in the event that the Navigator is configured to enforce an orbiting constraint to avoid spherical objects being rotated too far over its poles, the input will not rotate the object 600 any more in the x-z plane.

View Constraint

The Navigator can also constrain the view direction of the Navigator. For example, when orbiting around a sphere, the view direction may be towards the sphere's center and when orbiting along a plane, the view direction may be perpendicular to the plane.

Bumper Constraint

The Navigator can limit how close the user can navigate to an object by specifying a bumper. Bumpers can have different shapes; for example, a spherical node is likely to have a spherical bumper, a planar node is likely to have a planar bumper, and a planet may have a bumper that conforms closely to the topology of its surface. In some embodiments, each node has a 'bumper' that limits how close the user can approach. Bumpers simply prevent a user getting too close to something and losing their perspective of the content represented by the node or the content node adjacent to the node. Bumpers help the user get a sense of the presence of the object when they zoom in and hit the bumper.

Figure 7A:
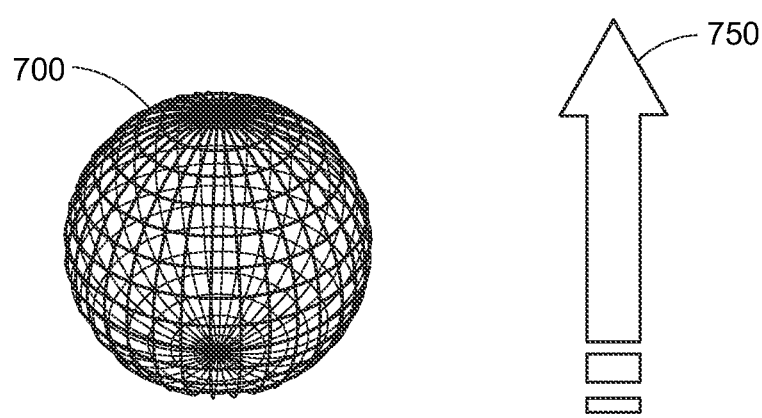
FIGS. 7A-7C illustrate an exemplarily three-dimensional spatial zooming user interface with a spherical object receiving a zoom-in input, but applying a bumper constraint according to some embodiments of the present technology.
Figure 7B:
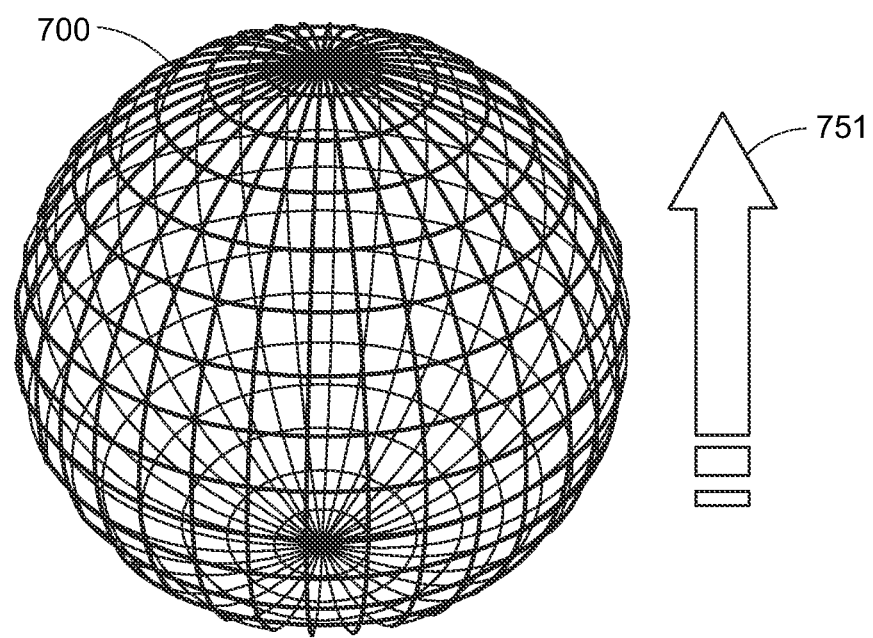
Figure 7C:
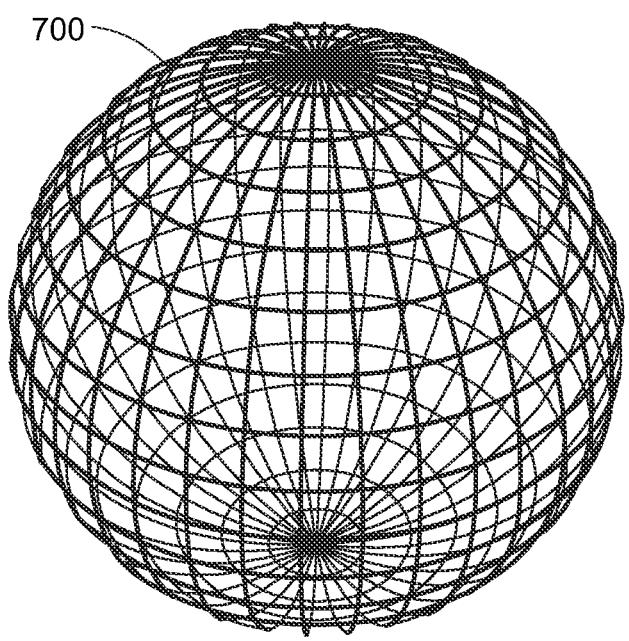

FIGS. 7A-7C illustrate an exemplarily three-dimensional spatial zooming user interface with a spherical object 700 receiving a zoom-in input, but applying a bumper constraint. As shown in FIG. 7A, the three-dimensional spatial zooming user interface includes a spherical object 700 viewed in a relatively far off point on the depth axis. However, FIG. 7A also illustrates a zoom input, as represented by arrow 750. According to FIG. 7B, the zoom input causes the three-dimensional spatial zooming user interface to become zoomed in on the (selected) object 700. Also illustrated in FIG. 7B is another zoom input, as represented by arrow 751; however, according to FIG. 7C, the object 700 is not zoomed in on any further due to a bumper constraint being enforced by the Navigator. In some embodiments, hitting up against a bumper causes a bounce-back-type animation to convey the presence of the bumper.

Ideal Distances

The Navigator can enforce ideal distances for viewing nodes. Nodes can have an ideal viewing distance, which is the user determined best viewing distance for that piece of content. When a node is selected, the Navigator moves the user to the ideal distance for that node. Often this is done with a zooming-in camera transition.

For example, the viewing distance of the sub-node 450 in FIG. 4B can represent an ideal viewing distance after being selected.

Navigating Layouts

If the selected node has children, the navigation actions and constraints can take the layout of the children into account. This enables the current level of the node tree to be viewed and navigated, and facilitates descent down the tree by selecting a child. For example, if the children are laid out in a ring, the Navigator may adjust the orbit action to cause it to travel around the ring, and it may constrain the viewing direction to always point to the center of the ring.

In addition, the layout can enforce an ideal viewing distance of its own so that when the node is selected, the Navigator travels to a distance at which all of the children in the layout are visible. The layout can also enforce a bumper to prevent the Navigator from approaching so closely that the structure of the layout becomes unclear.

If the Navigator is taken close to child, that child may automatically become the selection, and become the basis of navigation actions and constraints. In some cases, a layout's bumper may contain gaps, to allow access to the children.

Three-dimensional Spatial Zooming User Interface/Features

Some embodiments of the present technology involve additional features which improve the performance of the three-dimensional spatial zooming user interface. Below are listed various exemplary features and a description of how they improve the system.

Dynamic Level of Detail

As explained above, the Level of Detail (LOD) of an object can be dynamic. In some embodiments, as a user approaches an object the object is dynamically changed to become more complex or rich as it gets closer and bigger in view to the viewer. Dynamic LOD is illustrated in FIGS. 3A-3C above.

This can be technically achieved using one or more ways that result in a visually continuous and natural look, i.e. the changing level of detail makes sense to the user. For example, there should never be discontinuous visual artifacts or 'pops' in the level of detail.

In some embodiments, dynamic Level of Detail is enabled through a process of LOD Changing or LOD Adding. LOD Changing and Adding are different ways to achieve the result of adding more or less detail to an object or model depending on the level of zoom. For example, in the case of a three-dimensional space illustrating a tree in the distance, a viewer zooming in closer to the tree would expect to see individual branches and leaves. This can be accomplished by changing the model to an entirely different, more complex tree or by adding new layers (e.g. branches, leaves) to the existing model.

In some embodiments, dynamic Level of Detail is accomplished by LOD Re-formatting. LOD Re-formatting involves a data set being be rearranged on approach. An example of LOD re-formatting is illustrated in FIGS. 8A-8C.

Figure 8A:
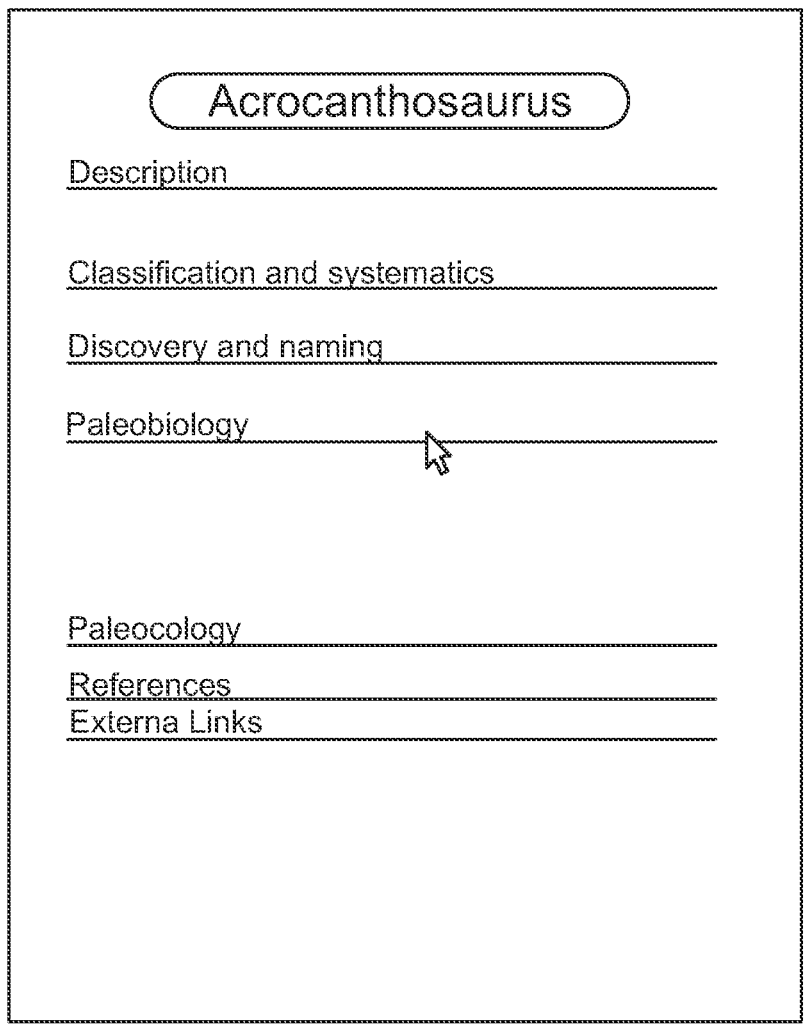
FIG. 8A illustrates a representation of a document object viewed at a zoomed out distance according to some embodiments of the present technology.
Figure 8B:
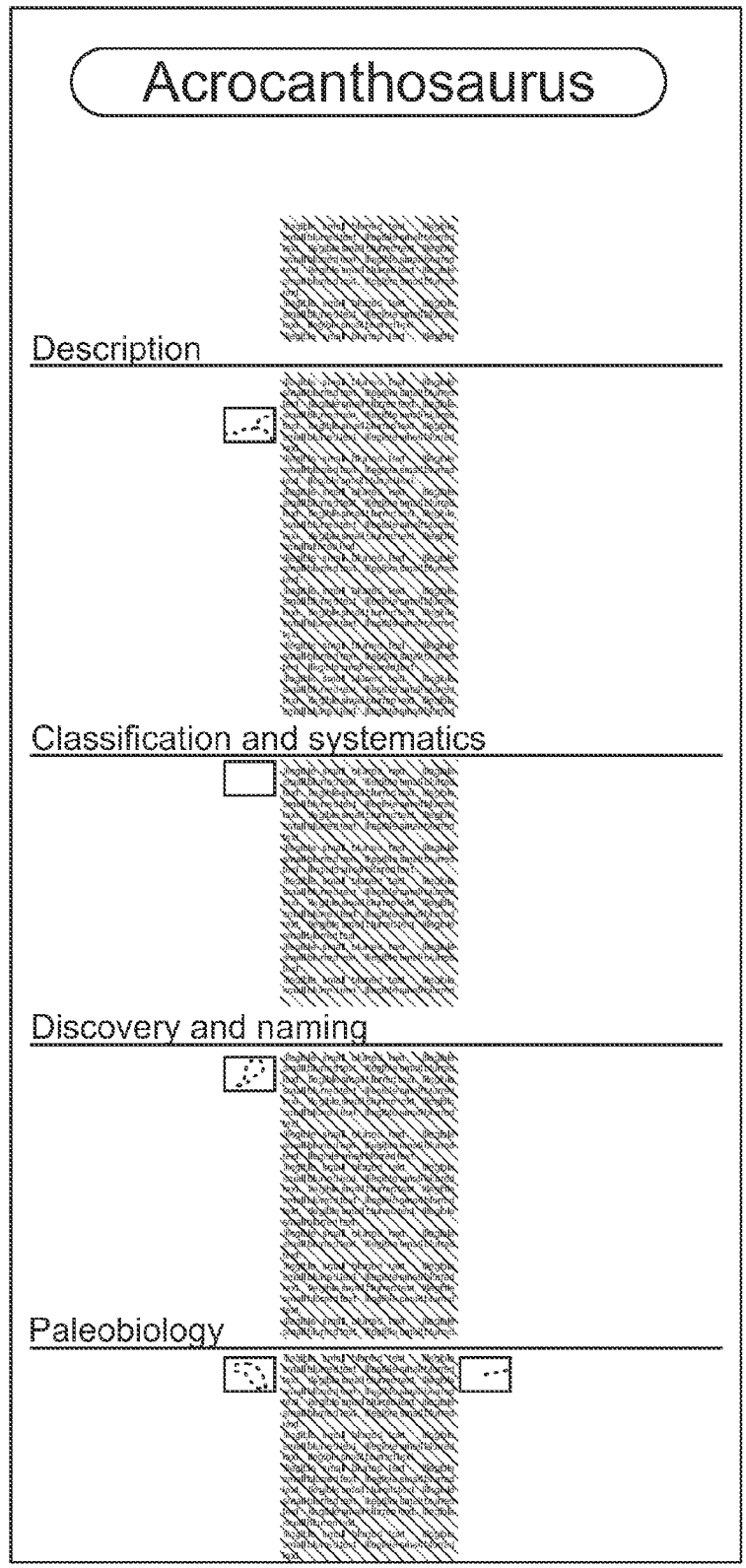
FIG. 8B illustrates a representation of the document object being viewed after a user begins zooming in on the object according to some embodiments of the present technology.

FIG. 8A illustrates a representation of a document object viewed at a zoomed out distance according to some embodiments of the present technology. Document object can include word processing documents, spreadsheets, presentations, webpages displaying text, etc. In some embodiments, navigating a document view can involve zooming in and out document sections. For example, as shown in FIG. 8A, a document describing a dinosaur is viewed in a zoomed out mode such that the user only sees sections headings or a table of contents. Upon approaching the table of contents, the document object can be re-formatted to show more detail. FIG. 8B illustrates a representation of the document object being viewed after a user begins zooming in on the object according to some embodiments of the present technology. As shown in FIG. 8B, the section headings are still the main focus of the document object, but the actual text of the document is also beginning to become more discernable. Upon further zooming, the text of document becomes more and more discernable, as shown in FIG. 8C.

Teleports: Portals and Re-parenting

Some embodiments of the present technology involve tools for enabling continuous browsing within multiple notionally and visually disjointed three-dimensional spaces.

Portals and re-parenting are forms of teleports in that they can take the user from one three-dimensional space into another in a continuous natural way that is implemented by the same navigation paradigm as the rest of the three-dimensional browsing experience.

Portals

Figure 9A:
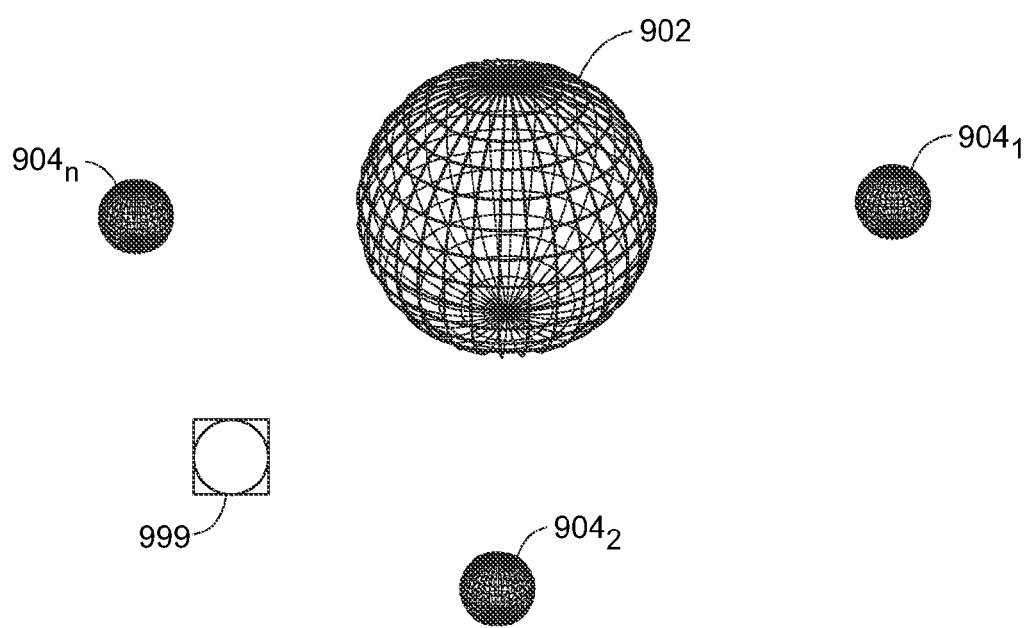
FIG. 9A illustrates an exemplary portal for navigating a user from one space to another space in three-dimensional spatial zooming user interface according to some embodiments of the present technology.
Figure 9B:
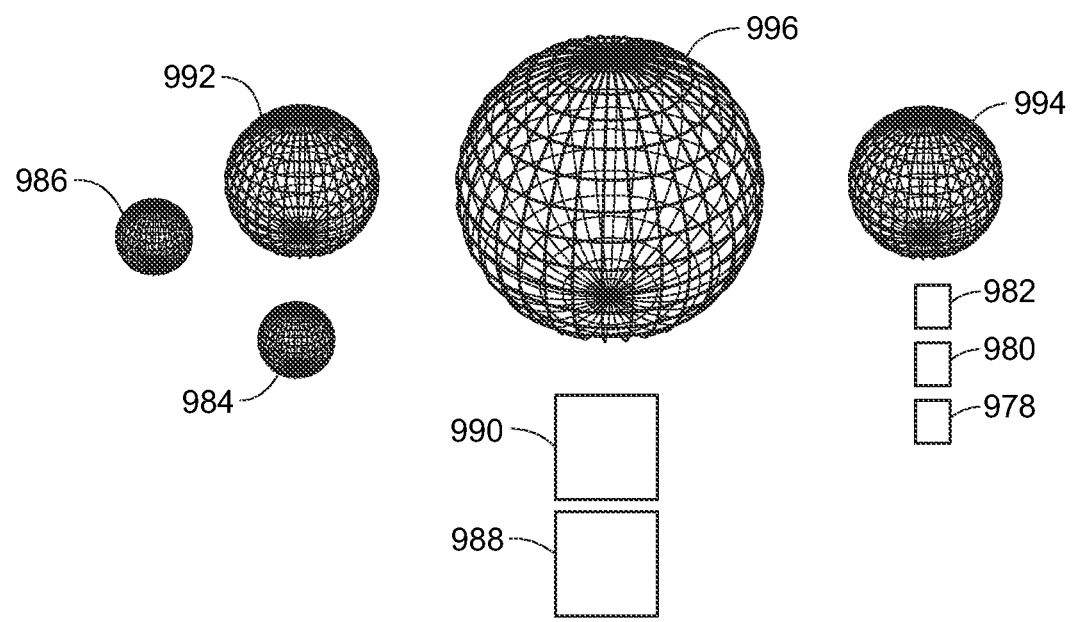
FIG. 9B illustrates a new space in a three-dimensional spatial zooming user interface that can be navigated to upon a user selecting the portal illustrated in FIG. 9A.

In some embodiments of the present technology, portals are functional 'links' to other three-dimensional spaces or even to parts of the current space. Portals can be three-dimensionally continuous equivalents of HTML hyperlinks; however, the portals are visible as gateways from one space into another. Portals can be naturally and continuously navigated by the Navigator to achieve the goal of being able to provide a seamless connection for the user as they browse multiple three-dimensional spaces. In some embodiments, from a distance, portals simply look like any other object node (i.e. an image, video, another node, etc.) and the user can click on the portal like any other object to select the portal. In some embodiments, once a portal is selected, zooming into the portal actually moves the viewer through the portal into the new three-dimensional space. FIGS. 9A-9B illustrate a portal navigating a user from one space to another space in three-dimensional spatial zooming user interface according to some embodiments of the present technology.

FIG. 9A three-dimensional spatial zooming user interface with a node 902, sub-nodes 904$_1$, 904$_2$, 904$_n$, and a portal 999 existing in a three-dimensional space. According to the exemplary interface illustrated in FIG. 9A, the node 902 and the sub-nodes 904$_1$, 904$_2$, 904$_n$ behave consistent with the description of navigation in this disclosure. However, selecting the portal 999 navigates the user to a different space within the three-dimensional spatial zooming user interface. Indeed, FIG. 9B illustrates a new space 998 that can be navigated to upon a user selecting the portal 999 in the space 901. As shown in FIG. 9B, the new space 998 comprises completely different nodes (996), sub-nodes (994, 992), grandchild nodes (986, 984), object nodes (990, 988), and sub-object nodes (982, 980, 978) than in FIG. 9A.

Browser Tabs

Upon teleporting and re-parenting, the viewer is visually teleported to a new three-dimensional space. To let the user know this has happened, and to facilitate easy navigation back to the previous three-dimensional space, a browser tab opens every time the viewer teleports.

Re-parenting

Re-parenting is a way of changing the three-dimensional space that an object resides in according to the distance of the viewer. On approaching the object, the three-dimensional space around the object is cross-faded into a new three-dimensional space while the object itself stays consistent.

For example imagine viewing a digital store in a three-dimensional space that has many three-dimensional objects (i.e. the products) laid out in an easy to navigate three-dimensional product catalog. As the user approaches closer to a given product (e.g. a snowboard) they may want to actually examine and manipulate that product or see further details about the product. At a closer distance, a re-parenting module allows the three-dimensional scene the catalog to be faded out to be replaced by a setting specific to the selected product (e.g. a virtual representation of a brick and mortar snowboard shop interior). This new setting can now also provide new objects (e.g. related products) and related information (e.g. snowboard reviews, videos, links to ski resorts, etc.). The new objects and information can then be explored or navigated as the user has now teleported into a new three-dimensional space in which he can continue to browse.

In some embodiments, upon zooming in on an object and causing a re-parenting event, a browser tab can open to allow a viewer to navigate back to the original (e.g. catalog) scene. In some embodiments, zooming out to a threshold distance away from the re-parented scene (e.g. snowboard shop) reverts the scene back to the original (e.g. catalog) scene.

The term re-parenting is used technically because the node that is currently selected in the three-dimensional spatial zooming user interface simply affects a change in its parent node (catalog node) in the mark-up tree to a new parent node (snowboard shop node) in a new three-dimensional space, and hence from that point on the user transitions to a new three-dimensional space.

In some embodiments, a skybox comprises a new scene fading in around the node, depending on distance as the old scene is faded out. Sometimes, a new scene is not faded in and simply the old scene above a given 'parent level' is faded out. This simply has the effect of 'de-cluttering' the scene from irrelevant data.

User Interface Layouts

In some embodiments of the present technology, the layout of content in a three-dimensional spatial zooming user interface is handled using three-dimensional flocking algorithms. Flocking content facilitates elegant looking and dynamic layouts of the data which can also support pleasing animations and re-arrangements of the content, e.g. when dragging a new item or items such as images into a content set (e.g. photo album) all the content would move around in a smoothly animated way to accommodate the new content. Some flocking techniques are illustrated in FIG. 3A. Also, as explained above, layouts can be subject to navigation constraints.

The flocking layout systems of the present technology enables users to easily select some simple predefined layouts such as ring, line, and ball layouts as well as using defaults depending on the number of objects being laid out. For example a ball layout can easily contain many more objects than a ring without looking cluttered or confusing. Likewise, a ring layout can contain many more objects than a line. As explained above, some embodiments of the present technology involve a GUI editor for a designer to explicitly specify how certain content should be laid out.

Content Layout

In some embodiments of the present technology, all nodes can host content by specifying a location, orientation, and scale for the content to exist in a three-dimensional space. These nodes can be relatives of other parent or child nodes or can be an object, such as two-dimensional or three-dimensional content. Objects that are three-dimensional content can be zoomed in upon, orbited, etc. The three-dimensional spatial zooming user interface can comprise a universal media browser which can render three-dimensional models of all types including complex interactive three-dimensional content, e.g. a whole planet that can be zoomed into centimeter level or an entire computer game world.

Two-dimensional, or "Planar", content is defined by anything that exists on a plane and can include images, text, traditional webpages or collections of either of these in combinations. Below are listed various exemplary two-dimensional viewing tools according to some embodiments of the present technology.

Image View

Some embodiments of the present technology involve images using an image view tool. Upon selecting (i.e. clicking or tapping) an image, the Navigator automatically displays the image at an ideal viewing distance for that image. The image view tool allows a user to zoom into images, and as the user zooms closer, the tool naturally scales the image for viewing at the required size. In some embodiments, when the Navigator is very close to an image, the tool also switches on a planar orbit constraint again naturally allowing the user to orbit very close up over the image.

Document View

Some embodiments of the present technology involve a document view tool. Viewing a document also lends itself well to continuous navigation in the three-dimensional spatial zooming user interface. Indeed, the document view tool utilizes level of detail rendition techniques such that, as the document is approached, the layout dynamically changes, as explained above.

Multi-planar View

In some embodiments, a multi-planar view tool is used to navigate objects. A multi-planar view can involve a parent plane with many planar subsections. The planar subsections can all be infinitely zoomable. The representations of the planar subsections can be constrained in a planar orbit within the parent plane. An example of a multi-planar view is a zoomable wall of images (e.g. the results of an image search) where zooming into sub-images can expand out further images around the sub-image and where all of the images are 'live' on the planar wall. The multi-planar view tool can also be used to navigate objects with multiple parts, e.g. books having multiple pages. In some embodiments, the multi-planar view tool provides a view of the book which comprises planar layout within a planar rectangle. It can itself be infinitely zoomed to implement various actions, such as displaying the results of an image search or to present a very large photo album in a manageable view.

Sensory Feedback

In some embodiments, the three-dimensional spatial zooming user interfaces described herein can also use other sensory feedback mechanisms to provide enhanced user experiences. For example, in some embodiments of the present technology, the three-dimensional spatial zooming user interfaces can provide visual displays as well as auditory and haptic feedback.

Some embodiments involve inserting sounds into the three-dimensional spatial zooming user interfaces. For example, sounds can be placed onto nodes and can have an auditory range within the space. In some cases, the auditory range can use a predetermined threshold distance to toggle the sound on and off. In some other cases, the volume, clarity, etc. of sounds can fade in as a navigator approaches a node and fall off as a navigator moves away from a node. In some embodiments both a threshold distance and a fade-in/falloff effect can be applied to nodes. For example, nodes can have a sphere of influence around them so as you approach a node by zooming into it the browser starts to stream in the sound to play it, altering the volume by the navigator's distance from the sound.

In an illustrative example, to give a very natural feel for finding music, a three-dimensional spatial explorable music catalog where using the navigator to orbit and zoom lets you see albums as well as audibly hear them playing as you get closer. In another example, ambient audio loops can be placed onto nodes in a three-dimensional photo viewing scene, including individual photos and whole photo albums, to give a natural audio backing track as you move and explore your photos.

In some embodiments of the present technology, haptic feedback can be provided while exploring three-dimensional spatial zooming user interfaces. In some embodiments, a device (e.g. mouse, game controller, etc.) used to navigate an interface or a device itself (e.g. a tablet, a touchscreen display, a track pad, etc.) can provide haptic feedback to the user. For example, a vibration can be delivered to a user's finger when using a touch screen to navigate content and when the user is constrained by a navigation constraint. In some embodiments, a degree of haptic feedback can be dynamic based on a rate of movement or on acceleration in movement. For example, a stronger vibration can be delivered to the user's finger when quickly orbiting into a navigation constraint threshold than if a user slowly reaches the threshold.

In some embodiments, multiple haptic feedback types can be used to deliver various types of navigational information to a user. For example, a persistent series of rapid, short-phase strong vibrational pulses can be used to notify a user that they have reached a navigation constraint threshold. In some cases, a one time weak vibrational pulse can be used each time a new node is selected. In some other cases, a series of vibrational pulses can quicken and become sharper in phase as a user navigates towards a portal.

In some embodiments of the present technology, multiple sensory feedback techniques can be used in concert. Additionally, although some specific examples of sensory feedback scenarios have been disclosed explicitly, those with ordinary skill in the art having the benefit of the present disclosure will readily understand that a wide variety of sensory feedback types are envisioned.

Customizing Nodes

Each node has a set of parameters that can be used to customize its appearance and functionality. In some embodiments, the browser includes editors for editing these parameters from within the browser itself. These editors can be constructed using nodes that are just like any other; thus they can themselves be edited.

Computing Environments

Figure 10A:
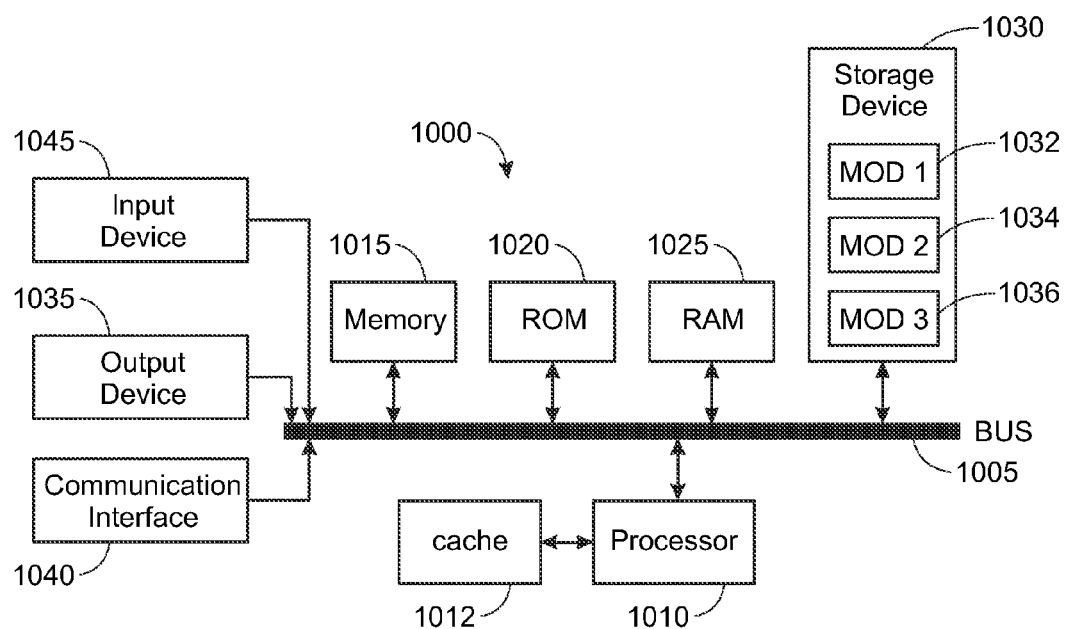
FIG. 10A illustrates a conventional bus computing system architecture according to some embodiments of the present technology.
Figure 10B:
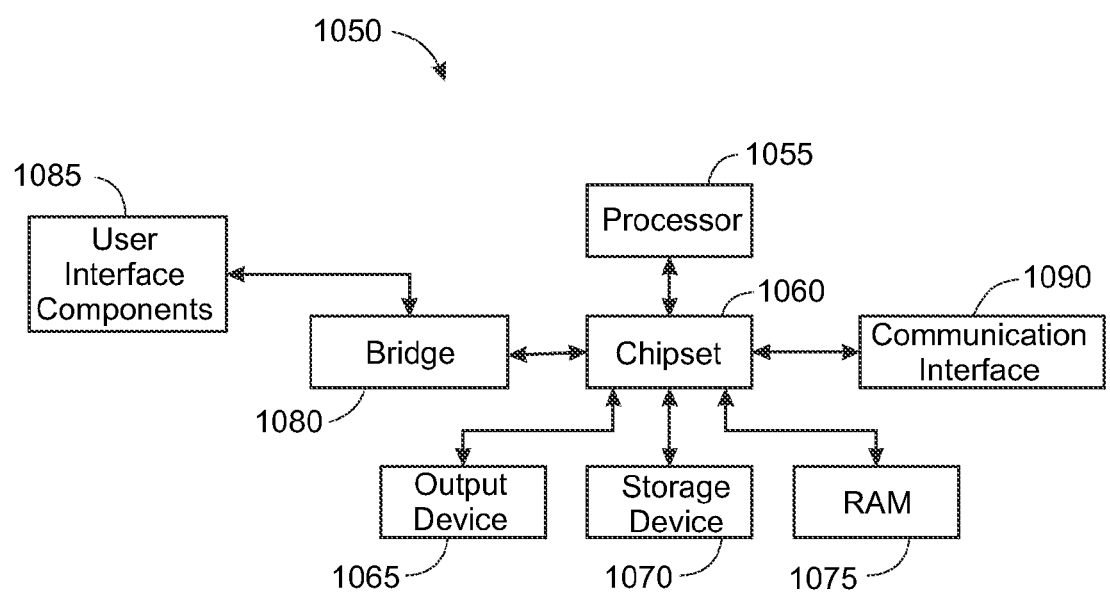
FIG. 10B illustrates a computer system having a chipset architecture according to some embodiments of the present technology.

FIG. 10A and FIG. 10B illustrate exemplary possible system embodiments. The more appropriate embodiment will be apparent to those of ordinary skill in the art when practicing the present technology. Persons of ordinary skill in the art will also readily appreciate that other system embodiments are possible.

FIG. 10A illustrates a conventional system bus computing system architecture 1000 wherein the components of the system are in electrical communication with each other using a bus 1005. Exemplary system 1000 includes a processing unit (CPU or processor) 1010 and a system bus 1005 that couples various system components including the system memory 1015, such as read only memory (ROM) 1020 and random access memory (RAM) 1025, to the processor 1010. The system 1000 can include a cache of high-speed memory connected directly with, in close proximity to, or integrated as part of the processor 1010. The system 1000 can copy data from the memory 1015 and/or the storage device 1030 to the cache 1012 for quick access by the processor 1010. In this way, the cache can provide a performance boost that avoids processor 1010 delays while waiting for data. These and other modules can control or be configured to control the processor 1010 to perform various actions. Other system memory 1015 may be available for use as well. The memory 1015 can include multiple different types of memory with different performance characteristics. The processor 1010 can include any general purpose processor and a hardware module or software module, such as module 1 1032, module 2 1034, and module 3 1036 stored in storage device 1030, configured to control the processor 1010 as well as a special-purpose processor where software instructions are incorporated into the actual processor design. The processor 1010 may essentially be a completely self-contained computing system, containing multiple cores or processors, a bus, memory controller, cache, etc. A multi-core processor may be symmetric or asymmetric.

To enable user interaction with the computing device 1000, an input device 1045 can represent any number of input mechanisms, such as a microphone for speech, a touch-sensitive screen for gesture or graphical input, keyboard, mouse, motion input, speech and so forth. An output device 1035 can also be one or more of a number of output mechanisms known to those of skill in the art. In some instances, multimodal systems can enable a user to provide multiple types of input to communicate with the computing device 1000. The communications interface 1040 can generally govern and manage the user input and system output. There is no restriction on operating on any particular hardware arrangement and therefore the basic features here may easily be substituted for improved hardware or firmware arrangements as they are developed.

Storage device 1030 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 1025, read only memory (ROM) 1020, and hybrids thereof.

The storage device 1030 can include software modules 1032, 1034, 1036 for controlling the processor 1010. Other hardware or software modules are contemplated. The storage device 1030 can be connected to the system bus 1005. In one aspect, a hardware module that performs a particular function can include the software component stored in a computer-readable medium in connection with the necessary hardware components, such as the processor 1010, bus 1005, display 1035, and so forth, to carry out the function.

FIG. 10B illustrates a computer system 1050 having a chipset architecture that can be used in executing the described method and generating and displaying a graphical user interface (GUI). Computer system 1050 is an example of computer hardware, software, and firmware that can be used to implement the disclosed technology. System 1050 can include a processor 1055, representative of any number of physically and/or logically distinct resources capable of executing software, firmware, and hardware configured to perform identified computations. Processor 1055 can communicate with a chipset 1060 that can control input to and output from processor 1055. In this example, chipset 1060 outputs information to output 1065, such as a display, and can read and write information to storage device 1070, which can include magnetic media, and solid state media, for example. Chipset 1060 can also read data from and write data to RAM 1075. A bridge 1080 for interfacing with a variety of user interface components 1085 can be provided for interfacing with chipset 1060. Such user interface components 1085 can include a keyboard, a microphone, touch detection and processing circuitry, a pointing device, such as a mouse, and so on. In general, inputs to system 1050 can come from any of a variety of sources, machine generated and/or human generated.

Chipset 1060 can also interface with one or more communication interfaces 1090 that can have different physical interfaces. Such communication interfaces can include interfaces for wired and wireless local area networks, for broadband wireless networks, as well as personal area networks. Some applications of the methods for generating, displaying, and using the GUI disclosed herein can include receiving ordered datasets over the physical interface or be generated by the machine itself by processor 1055 analyzing data stored in storage 1070 or 1075. Further, the machine can receive inputs from a user via user interface components 1085 and execute appropriate functions, such as browsing functions by interpreting these inputs using processor 1055.

It can be appreciated that exemplary systems 1000 and 1050 can have more than one processor 510 or be part of a group or cluster of computing devices networked together to provide greater processing capability.

For clarity of explanation, in some instances the present technology may be presented as including individual functional blocks including functional blocks comprising devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

We claim:

1. A system for navigating a three-dimensional browsing interface comprising:
    an interface rendition module configured to arrange a hierarchy of data objects in a three-dimensional content browsing interface, wherein a hierarchal relationship is represented by a parent data node having a higher position in the hierarchy being orbited by a plurality of child data nodes having a lower position in the hierarchy;
    a focus module configured to accept a selection command applied to the parent node, the selection command being effective to cause additional interface navigation commands to navigate the three-dimensional browsing interface relative to the selected parent node;
    a zoom module configured to accept a zoom command for navigating a depth axis of the three-dimensional content browsing interface;
    an orbit module configured to:
        apply a flocking technique for automatically arranging the plurality of child data nodes in an orbit around the parent; and
        apply a bumper constraint to the parent node in the form of a spherical boundary around the parent node that prevents the zoom command from allowing the zoom command to navigate within beyond a predetermined threshold closeness to the parent node, wherein the bumper constraint further includes gaps in the spherical boundary near locations of the child nodes, wherein the gaps allow zoom commands along the depth axis that aligns with the gap to navigate through the spherical boundary despite the bumper constraint;
    wherein the focus module is further configured to automatically re-select a child node upon receiving a zoom command for navigating along the depth axis through the gap within a predetermined threshold zoom limit of the child node, wherein re-selection of the child node causes additional interface navigation commands to navigate the three-dimensional browsing interface relative to the re-selected child node instead of the parent node.

2. The system of claim 1, further comprising:
    a teleport module configured to:
        display a teleportation node in the interface;
        launch, upon the teleportation node receiving the selection command and the zoom command, an additional three-dimensional content browsing interface; and
    display a browser tab configured to accept a tab selection for returning to the original three-dimensional content browsing interface.

3. The system of claim 1, wherein the interface rendition module is further configured to display a bounce back animation to indicate the presence of the bumper constraint upon receiving a zoom command that attempts to navigate within beyond a predetermined threshold closeness to the parent node.

4. The system of claim 1, wherein orbit is evenly-spaced ring orbit.

5. The system of claim 1, wherein orbit is evenly-spaced spherical orbit.

6. The system of claim 5, wherein the interface rendition module is further configured to launch a full version of the executable application upon receiving a zoom command for navigating along the depth axis through the gap within the predetermined threshold zoom limit of the child node.

7. The system of claim 6, wherein the interface rendition module is further configured to play the sound at a higher volume upon receiving a zoom command for navigating along the depth axis through the gap within the predetermined threshold zoom limit of the child node.

8. The system of claim 1, wherein the child node represents an executable application, and wherein the interface rendition module is further configured to launch a lite version of the executable application upon receiving a zoom command for navigating along the depth axis to a predetermined distance away the child node.

9. The system of claim 1, wherein the child node represents a data object having a sound component, and wherein the interface rendition module is further configured to play a sound at low volume upon receiving a zoom command for navigating along the depth axis to a predetermined distance away the child node.

* * * * *